(12) United States Patent
Tamba et al.

(10) Patent No.: US 12,031,289 B2
(45) Date of Patent: Jul. 9, 2024

(54) WORKING MACHINE

(71) Applicant: KUBOTA CORPORATION, Osaka (JP)

(72) Inventors: Daiki Tamba, Sakai (JP); Yukifumi Yamanaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 379 days.

(21) Appl. No.: 17/543,782

(22) Filed: Dec. 7, 2021

(65) Prior Publication Data

US 2022/0090345 A1 Mar. 24, 2022

Related U.S. Application Data

(63) Continuation of application No. PCT/JP2020/024731, filed on Jun. 24, 2020.

(30) Foreign Application Priority Data

Jun. 28, 2019 (JP) .................................. 2019-122521
Jun. 28, 2019 (JP) .................................. 2019-122522
Jun. 28, 2019 (JP) .................................. 2019-122523

(51) Int. Cl.
*E02F 3/00* (2006.01)
*E02F 3/34* (2006.01)
*E02F 9/20* (2006.01)
*E02F 9/22* (2006.01)

(52) U.S. Cl.
CPC .......... *E02F 3/3414* (2013.01); *E02F 9/2075* (2013.01); *E02F 9/2246* (2013.01); *E02F 9/2253* (2013.01); *E02F 9/2285* (2013.01); *E02F 9/2292* (2013.01)

(58) Field of Classification Search
CPC ...... B25J 9/1638; B25J 9/1628; B25J 9/1633; B25J 13/085; B25J 9/1602; B25J 9/161;
(Continued)

(56) References Cited

U.S. PATENT DOCUMENTS 10,207,700 B2 * 2/2019 Kaneko .................. B60L 50/16
10,272,900 B2 * 4/2019 Kaneko .................. F02D 29/00
(Continued)

FOREIGN PATENT DOCUMENTS

EP    3 266 942 A1    1/2018
EP    3 336 264 A1    6/2018
(Continued)

OTHER PUBLICATIONS

Official Communication issued in corresponding European Patent Application No. 20831186.0, mailed on Jun. 12, 2023.
(Continued)

*Primary Examiner* — Ian Jen
(74) *Attorney, Agent, or Firm* — Keating & Bennett, LLP

(57) ABSTRACT

A working machine includes a machine body, an engine on the machine body, a motor/generator to perform an assisting action in which the motor/generator functions as a motor to assist the engine in driving and an electricity generating action in which the motor/generator functions as a generator to generate electricity using power from the engine, a working device to function using power from the engine and the motor/generator, a work operation actuator for operation of the working device, an action controller to cause the assisting action to be performed when a rotation speed of the engine is equal to or less than a first rotation speed and cause the electricity generating action to be performed when the rotation speed of the engine is equal to or greater than a second rotation speed greater than the first rotation speed, and a speed controller to change the first rotation speed or the second rotation speed according to an operation amount of the work operation actuator.

14 Claims, 19 Drawing Sheets

(58) Field of Classification Search
CPC ... B25J 13/00; B25J 9/00; G05B 2219/37357; G05B 2219/39188; G05B 2219/39338; G05B 2219/39342; G05B 2219/39343; G05B 2219/39346; G05B 2219/39347; G05B 2219/39348; G05B 2219/39351; G05B 2219/42016; G05B 1/01; G05B 19/00; G05B 2219/39; G05B 2219/39344; A61B 34/30; G05D 3/12

See application file for complete search history.

(56) References Cited

U.S. PATENT DOCUMENTS

| | | | |
|---|---|---|---|
| 10,273,656 B2 * | 4/2019 | Hoshino | ............... B60W 10/06 |
| 2017/0362799 A1 | 12/2017 | Nakagawa et al. | |
| 2018/0266080 A1 | 9/2018 | Fukuda | |

FOREIGN PATENT DOCUMENTS

| | | | |
|---|---|---|---|
| JP | 2015-140800 A | 8/2015 | |
| JP | 2016-153268 A | 8/2016 | |
| JP | 2017-226284 A | 12/2017 | |
| JP | 2018-090125 A | 6/2018 | |
| JP | 2018-154970 A | 10/2018 | |
| WO | 2014/136834 A1 | 9/2014 | |
| WO | 2019/074301 A1 | 4/2019 | |

OTHER PUBLICATIONS

Official Communication issued in International Patent Application No. PCT/JP2020/024731, mailed on Sep. 1, 2020.

* cited by examiner

WORKING MACHINE

CROSS REFERENCE TO RELATED APPLICATIONS

This application is a continuation application of International Application No. PCT/JP2020/024731, filed on Jun. 24, 2020, which claims the benefit of priorities to Japanese Patent Application No. 2019-122521, filed on Jun. 28, 2019, and to Japanese Patent Application No. 2019-122522, filed on Jun. 28, 2019 and to Japanese Patent Application No. 2019-122523, filed on Jun. 28, 2019. The entire contents of each of these applications are hereby incorporated herein by reference.

BACKGROUND OF THE INVENTION

1. Field of the Invention

The present invention relates to a working machine such as a compact track loader or a skid-steer loader.

2. Description of the Related Art

With regard to a working machine such as a compact track loader, PCT International Application Publication No. WO2014/136834 discloses a hybrid-type working machine which includes an engine and a motor/generator. The working machine of PCT International Application Publication No. WO2014/136834 is such that, excavation work, during which the output of a hydraulic pump is expected to be high, is performed in a work mode which is a first mode; non-excavation work, during which the output of the hydraulic pump is somewhat lower than in excavation state, is performed in a work mode which is a second mode; and determination regarding an assisting action by the motor/generator is performed according to whether the work mode is the first mode or the second mode.

SUMMARY OF THE INVENTION

In PCT International Application Publication No. WO2014/136834, determination regarding the assisting action is performed according to work done by the working machine. However, even if the work done by the working machine is the same, the work may require different forces (working forces), and therefore, in reality, it is not possible to perform an assisting action and/or the like sufficiently corresponding to the work.

In PCT International Application Publication No. WO2014/136834, determination regarding the assisting action is performed according to work done by the working machine. However, an assisting action is sometimes performed even through the engine is not working at full power.

In PCT International Application Publication No. WO2014/136834, determination regarding the assisting action is performed according to work done by the working machine. However, even if the work done by the working machine is the same, the work may require different forces (working forces), and therefore, in reality, it is not possible to perform an assisting action and/or the like sufficiently corresponding to the work.

Preferred embodiments of the present invention provide working machines, each of which makes it possible to flexibly change the output depending on the work. Preferred embodiments of the present invention also provide working machines, each of which makes it possible to effectively assist an engine when needed.

A working machine according to a preferred embodiment of the present invention includes a machine body, an engine on the machine body, a motor/generator to perform an assisting action in which the motor/generator functions as a motor to assist the engine in driving and an electricity generating action in which the motor/generator functions as a generator to generate electricity using power from the engine, a working device to function using power from the engine and the motor/generator, a work operation actuator for operation of the working device, an action controller to cause the assisting action to be performed when a rotation speed of the engine is equal to or less than a first rotation speed and cause the electricity generating action to be performed when the rotation speed of the engine is equal to or greater than a second rotation speed greater than the first rotation speed, and a speed controller to change the first rotation speed or the second rotation speed according to an operation amount of the work operation actuator.

The working device includes a boom swingably provided on the machine body, a boom cylinder to swing the boom, a working tool swingably provided on the boom, and a working tool cylinder to swing the working tool, and the speed controller makes a change of the first rotation speed or the second rotation speed according to the operation amount of the work operation actuator operated to activate the working tool cylinder.

When the work operation actuator is operated to activate the boom cylinder and the working tool cylinder, the speed controller does not make the change of the first rotation speed or the second rotation speed according to the operation amount.

When the work operation actuator is operated to activate the boom cylinder to raise the boom, the speed controller does not make the change of the first rotation speed or the second rotation speed according to the operation amount.

A working machine includes a machine body, an engine on the machine body, a motor/generator to perform an assisting action in which the motor/generator functions as a motor to assist the engine in driving and an electricity generating action in which the motor/generator functions as a generator to generate electricity using power from the engine, a hydraulic driver to receive power from the engine and the motor/generator, an operation actuator for operation of the hydraulic driver, and a controller to set, according to a change in rotation speed of the engine after operation of the operation actuator, a point in time at which the assisting action is performed.

The controller is configured or programmed to cause the assisting action to be performed after the rotation speed of the engine has started decreasing after having increased.

The working machine further includes an operation valve to determine a pilot pressure according to the operation of the operation actuator, wherein an output of the hydraulic driver changes with the pilot pressure determined by the operation valve.

The working machine further includes a pair of traveling devices on the machine body, and a pair of travel motors to drive the pair of traveling devices, wherein the hydraulic driver includes a pair of travel pumps to drive the pair of travel motors.

The controller is configured or programmed to cause the assisting action to be started when a speed at which the machine body is turned by the pair of traveling devices has increased and the rotation speed of the engine has decreased after having increased.

A working machine includes a machine body, an engine on the machine body, a motor/generator to perform an assisting action in which the motor/generator functions as a motor to assist the engine in driving and an electricity generating action in which the motor/generator functions as a generator to generate electricity using power from the engine, a pair of traveling devices on the machine body, a travel operation actuator for operation of the pair of traveling devices, an action controller to cause the assisting action to be performed when a rotation speed of the engine is equal to or less than a first rotation speed and cause the electricity generating action to be performed when the rotation speed of the engine is equal to or greater than a second rotation speed greater than the first rotation speed, and a speed controller to change the first rotation speed or the second rotation speed according to an operation amount of the travel operation actuator.

The machine body is configured to make a first turn in which one of the pair of traveling devices is driven and the other is stopped and a second turn in which the pair of traveling devices are driven in respective different directions, and the speed controller changes the first rotation speed or the second rotation speed according to a first operation amount or a second operation amount, the first operation amount being the operation amount of the travel operation actuator operated to make the first turn, the second operation amount being the operation amount of the travel operation actuator operated to make the second turn.

The speed controller is configured or programmed to increase the first rotation speed or the second rotation speed according to the first operation amount when the first turn is made, and reduce the first rotation speed or the second rotation speed according to the second operation amount when the second turn is made.

The working machine further includes a pair of travel motors to drive the pair of traveling devices, respectively, and a pair of travel pumps to drive the pair of travel motors, wherein the travel operation actuator is for operation of the pair of travel pumps.

One of the pair of travel pumps is a swash plate pump to change, according to a pilot pressure acting on a first pressure receiver and a second pressure receiver, a driving force to drive one of the pair of travel motors, and the other of the pair of travel pumps is a swash plate pump to change, according to a pilot pressure acting on a third pressure receiver and a fourth pressure receiver, a driving force to drive the other of the pair of travel motors.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
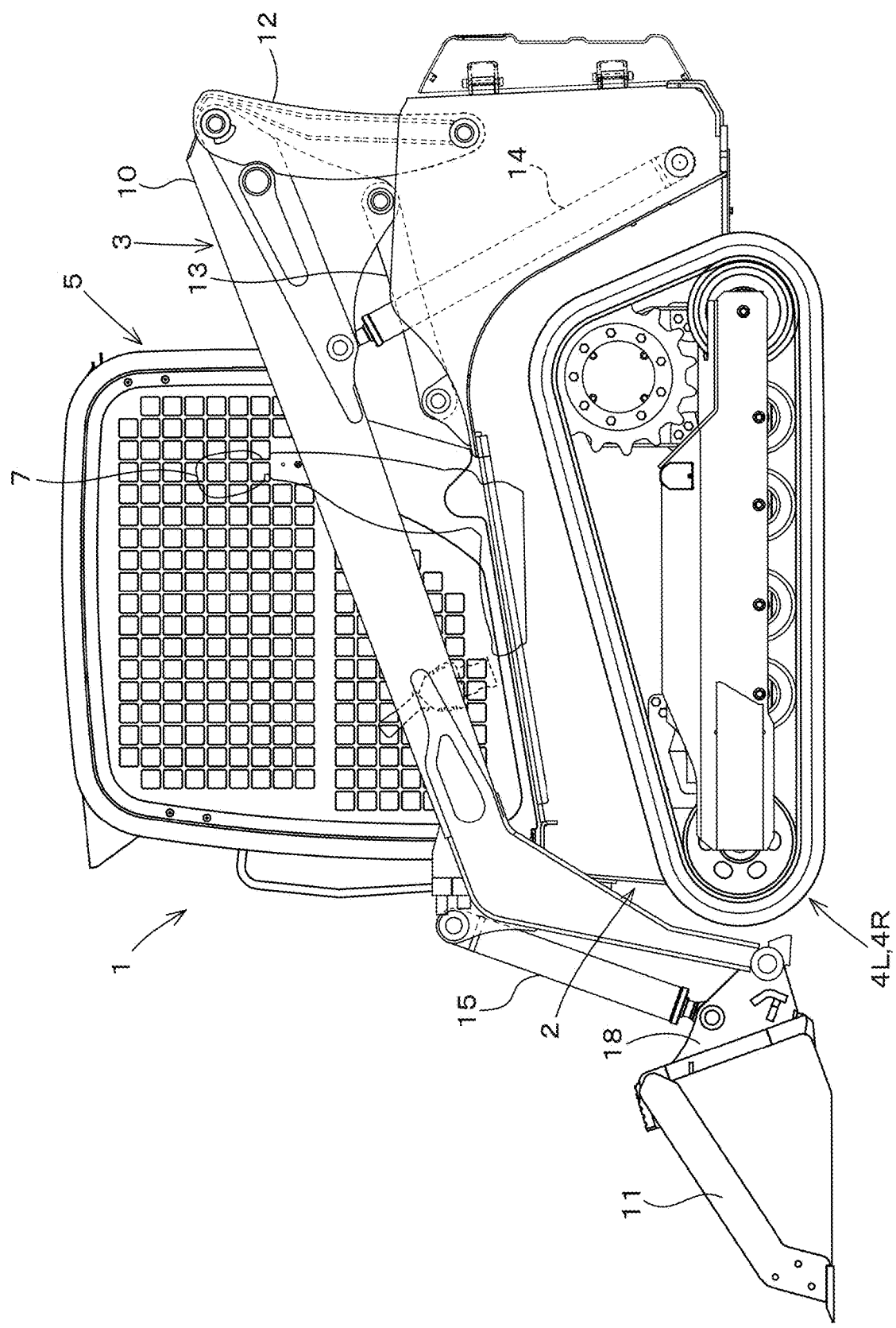
FIG. 1 is a general side view of a working machine.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of working machines according to the present invention with reference to drawings.

FIG. 1 is a side view of a working machine 1 according to a preferred embodiment of the present invention. FIG. 1 illustrates a compact track loader as an example of a working machine. Note, however, that the working machines according to preferred embodiments of the present invention are not limited to a compact track loader and may be, for example, another type of loader working machine such as a skid-steer loader. The working machines according to preferred embodiments of the present invention may be working machines other than loader working machines. Note that the description in the present application is based on the assumption that the front end (left in FIG. 1) of the working machine as viewed from an operator seated on an operator's seat of the working machine is "front" or "forward", that the rear end (right in FIG. 1) as viewed from the operator is "rear" or "rearward", that the left side (near side in FIG. 1) as viewed from the operator is "left" or "leftward", and that the right side (far side in FIG. 1) as viewed from the operator is "right" or "rightward". The description may be based on the assumption that a direction orthogonal to a front-rear direction of the machine body is "machine body width direction (width direction)."

The working machine 1 includes a machine body 2, a working device 3, and a pair of traveling devices 4L and 4R.

A cabin 5 is mounted above a front portion of the machine body 2. A rear portion of the cabin 5 is supported on a bracket of the machine body 2 swingably about a support shaft. A front portion of the cabin 5 is configured to be placed on the front portion of the machine body 2. The cabin 5 is provided with an operator's seat 7 therein.

The pair of traveling devices 4L and 4R preferably include crawler-type traveling devices. The traveling device 4L is provided on one of the opposite sides (left side) of the machine body 2, and the traveling device 4R is provided on the other of the opposite sides (right side) of the machine body 2.

The working device 3 includes booms 10, boom cylinders 14, working tool cylinders 15, and a working tool 11. Each boom 10 is supported by a lift link 12 and a control link 13. The boom cylinders 14, which each preferably include a double-acting hydraulic cylinder, are provided between proximal portions of the booms 10 and a lower rear portion of the machine body 2. Concurrent extension or retraction of the boom cylinders 14 causes the booms 10 to swing up or down. Each boom 10 has, at a distal end thereof, a mounting bracket 18 supported pivotably about a lateral axis, and a back of the working tool 11 is attached to such mounting brackets 18 provided on left and right sides. That is, the working tool 11 is attached to distal ends of the booms 10.

Furthermore, each of the working tool cylinders 15, including a double-acting hydraulic cylinder, is provided between a corresponding mounting bracket 18 and an intermediate portion of a distal portion of a corresponding boom 10. Extension or retraction of the working tool cylinders 15 causes the working tool 11 to swing (scoop action, dump action).

The working tool 11 is configured to be attached to and detached from the mounting brackets 18. The working tool 11 is, for example, an attachment (auxiliary attachment) such as a bucket, a hydraulic crusher, a hydraulic breaker, an angle broom, an earth auger, a pallet fork, a sweeper, a mower, or a snow blower.

The following description discusses the machine body.

Figure 2:
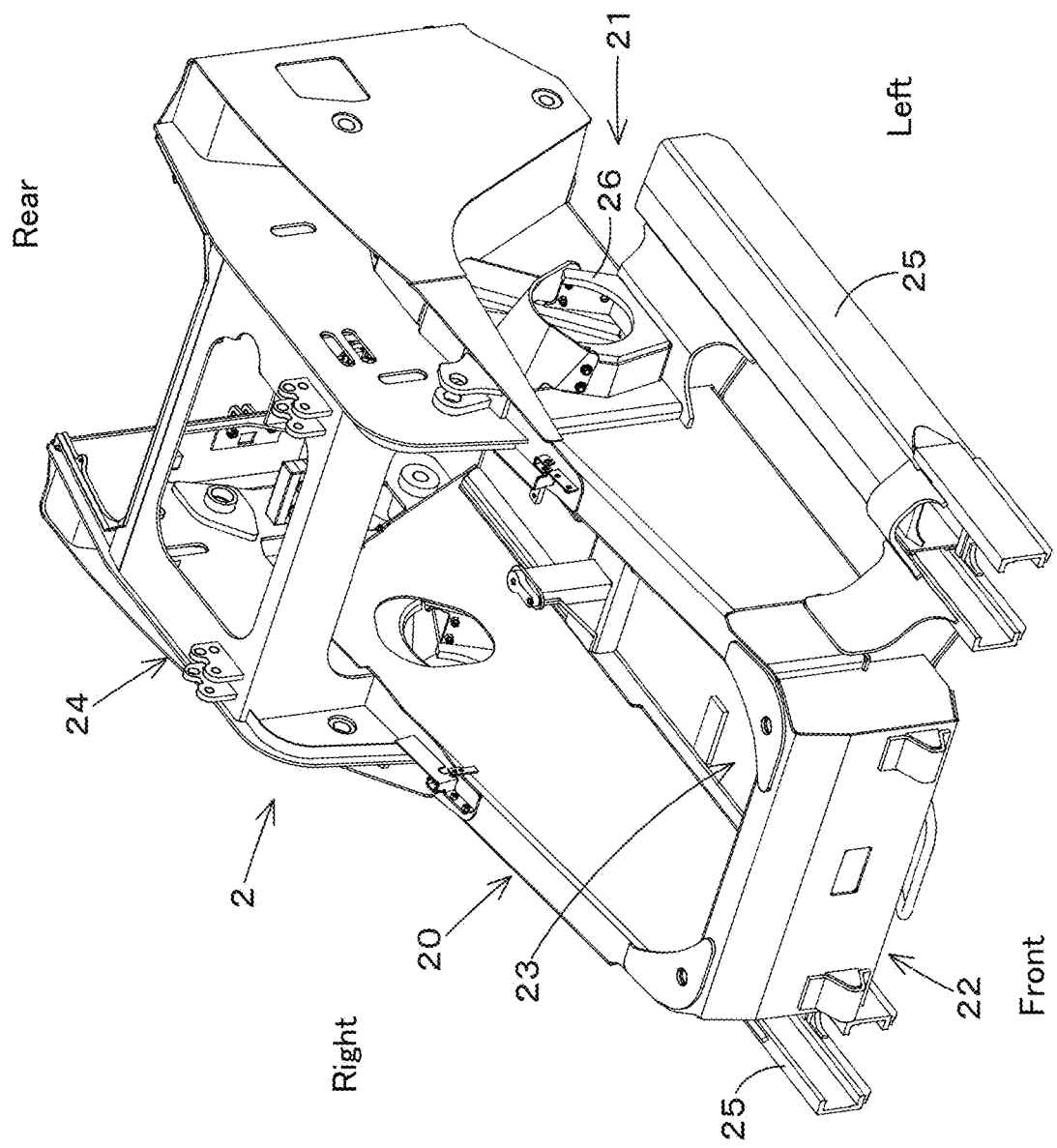
FIG. 2 is a perspective view of a machine body.

As illustrated in FIG. 2, the machine body 2 includes a right frame portion 20, a left frame portion 21, a front frame portion 22, a bottom frame portion 23, and a top frame portion 24.

The right frame portion 20 defines a right portion of the machine body 2. The left frame portion 21 defines a left portion of the machine body 2. The front frame portion 22 defines a front portion of the machine body 2 and connects front portions of the right frame portion 20 and the left frame portion 21 together. The bottom frame portion 23 defines a bottom portion of the machine body 2 and connects lower portions of the right frame portion 20 and the left frame portion 21 together. The top frame portion 24 defines an upper rear portion of the machine body 2 and connects upper rear portions of the right frame portion 20 and the left frame portion 21 together.

Rear portions of the right frame portion 20 and the left frame portion 21 swingably support the booms 10 or the like. The right frame portion 20 and the left frame portion 21 are each provided with a track frame 25 and a motor mounting portion 26.

Figure 3:
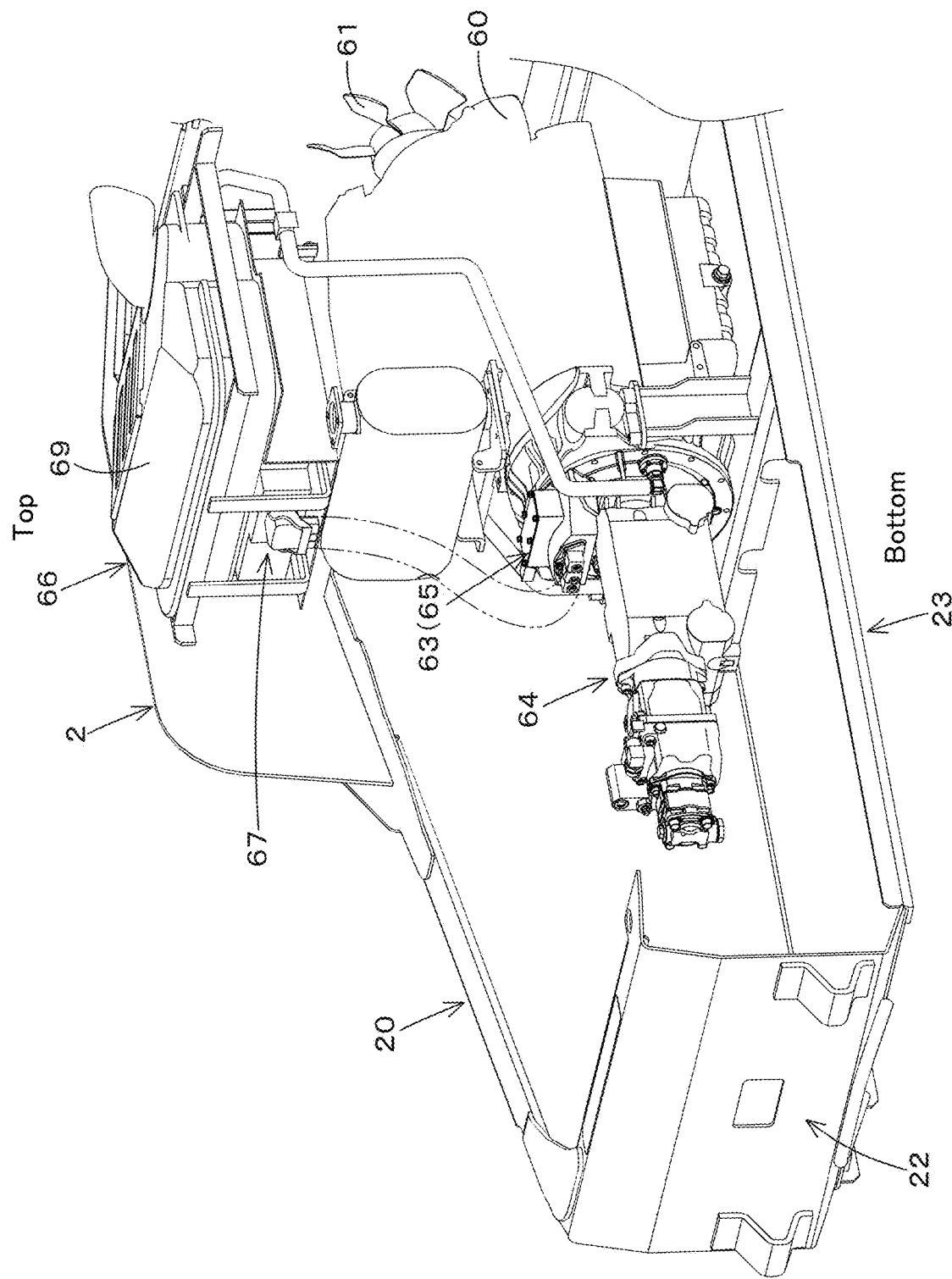
FIG. 3 is a perspective view illustrating how pieces of equipment (devices) are arranged.

As illustrated in FIG. 3, the machine body 2 is provided with an engine 60, a cooling fan 61, a radiator, a motor/generator 63, and a hydraulic driver 64. The engine 60 is an internal combustion engine such as a diesel engine or a gasoline engine. The cooling fan 61 is driven by power from the engine 60. The radiator cools cooling water for the engine 60. The motor/generator 63 performs an assisting action in which the motor/generator 63 functions as a motor to assist the engine 60 in driving and an electricity generating action in which the motor/generator 63 functions as a generator to generate electricity using the power from the engine 60. The motor/generator 63 is a motor/generator and includes a permanent magnet three-phase AC synchronous motor as a driver.

Figure 5:
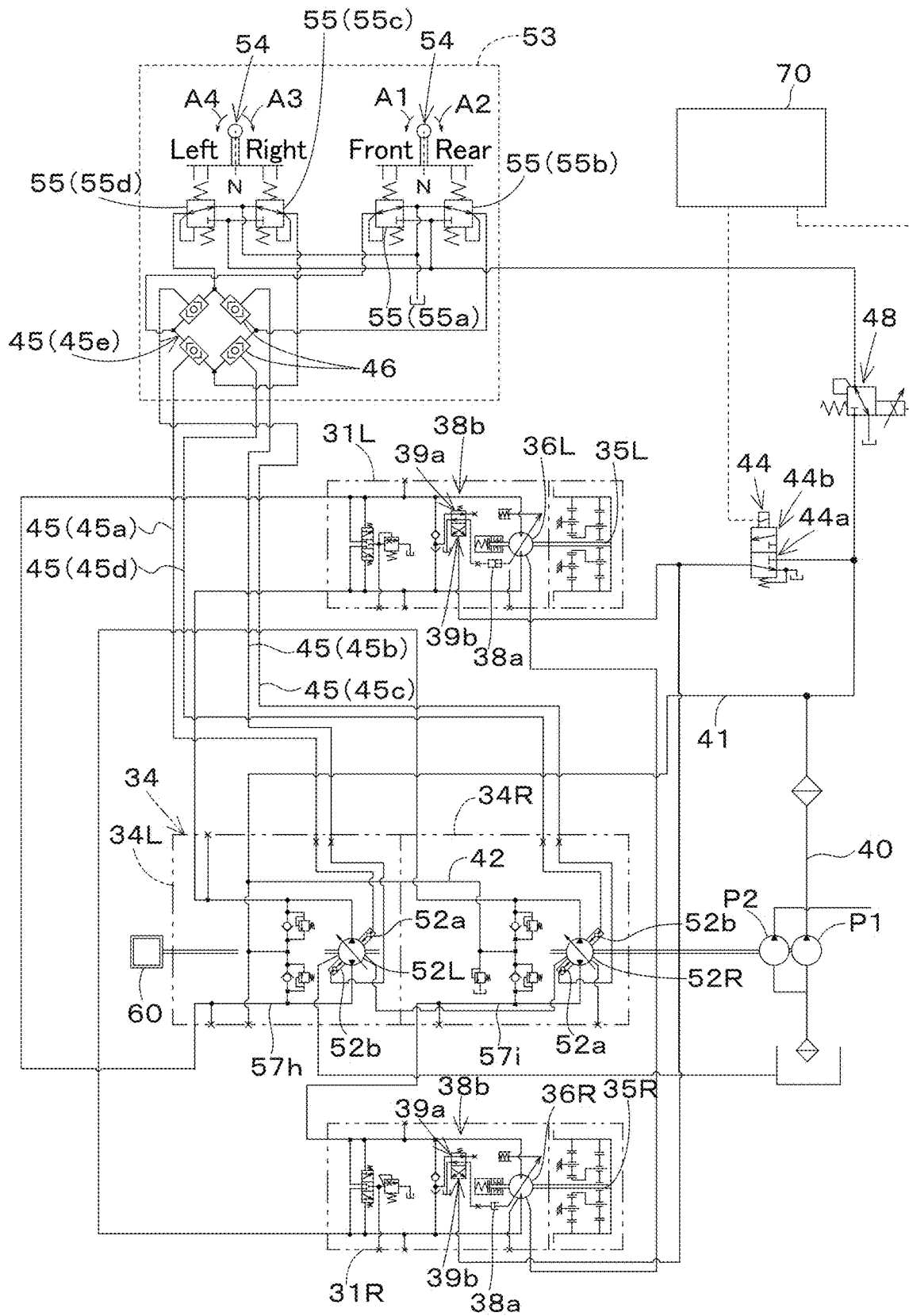
FIG. 5 shows a hydraulic system of a travel system.
Figure 6:
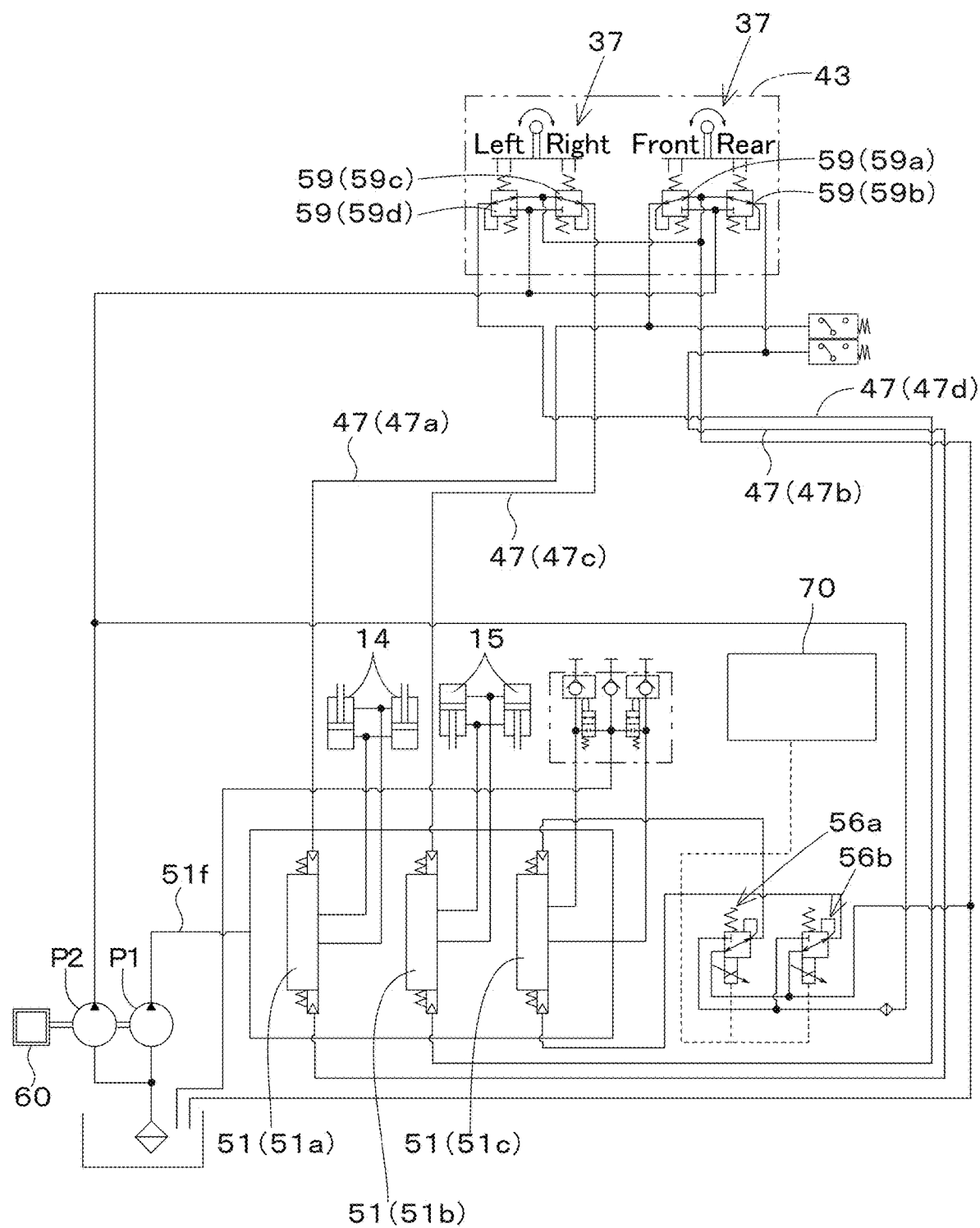
FIG. 6 shows a hydraulic system of a work system.

The hydraulic driver 64 is a device driven by power from the engine 60 and/or the motor/generator 63, and outputs power mainly for work. The hydraulic driver 64 is provided forward of the motor/generator 63. The hydraulic driver 64 includes a plurality of hydraulic pumps. The plurality of hydraulic pumps include, for example, as illustrated in FIGS. 5 and 6, a travel pump 52L, a travel pump 52R, a sub-pump P1, and a main pump P2.

The machine body 2 is provided with a battery 66 and an electricity controller 67. The battery 66 stores electricity generated by the motor/generator 63 and supplies the stored electricity to the motor/generator 63 and the like.

With the working machine 1, the hydraulic driver 64 can be driven by power from the engine 60, the hydraulic driver 64 can be driven using both the engine 60 and the motor/generator 63, and the motor/generator 63 can be caused to function to generate electricity using power from the engine 60. That is, transmission of power in the working machine is of a parallel hybrid type. The following description discusses a structure which transmits power from the engine 60 and the motor/generator 63.

Figure 4:
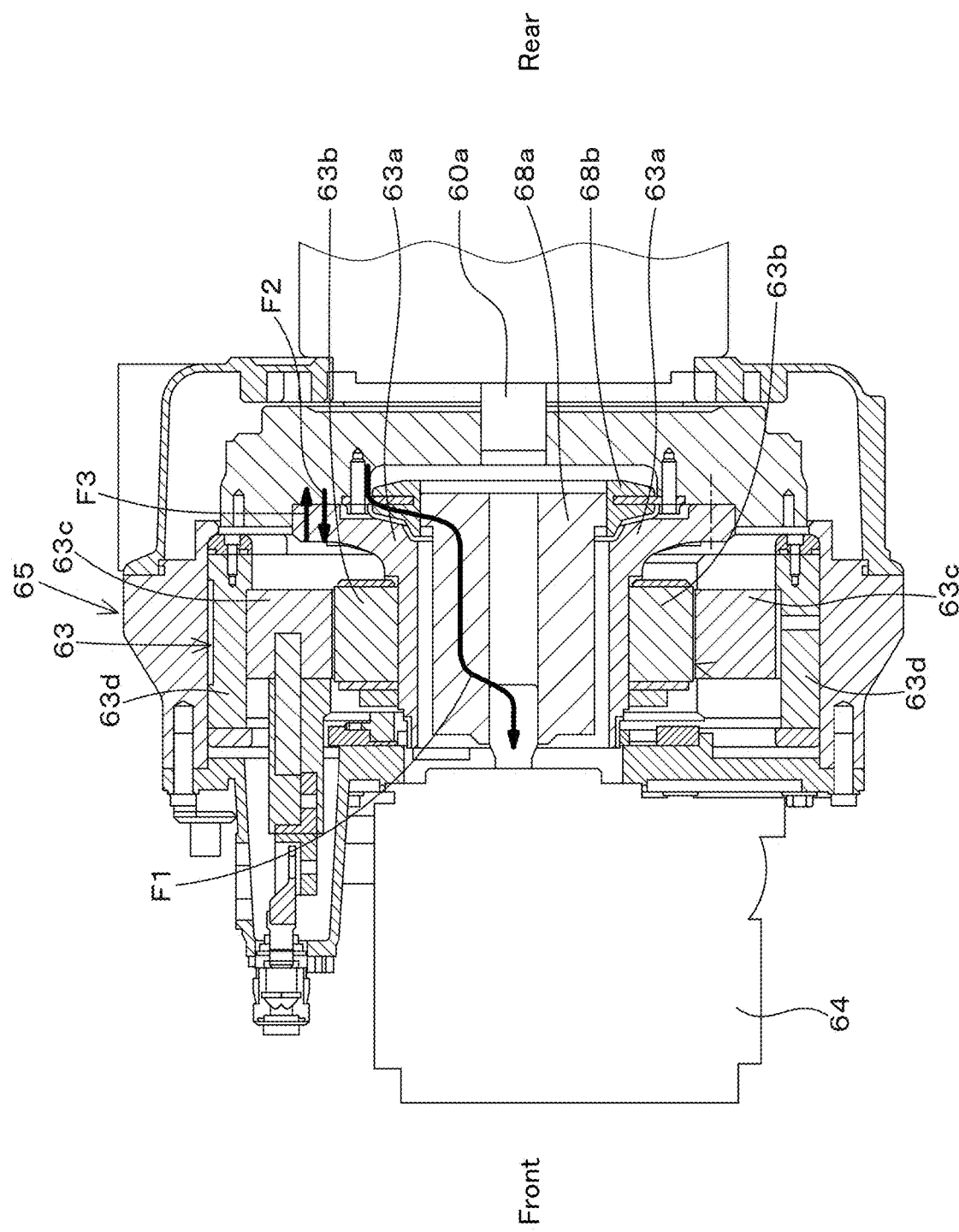
FIG. 4 is a cross-sectional view of an interior of a rotating electrical machine.

As illustrated in FIGS. 3 and 4, a housing 65 which houses a substantially disc-shaped flywheel and the motor/generator 63 is provided in front of the engine 60. The motor/generator 63 includes a connector 63a connected to the flywheel, a rotor 63b fixed to the connector 63a, a stator 63c provided on the rotor 63b, and a water jacket 63d provided outside the stator 63c.

The connector 63a is in the form of a tube and includes a rear end attached to the flywheel. The connector 63a has an intermediate shaft 68a provided in the space defined thereby The intermediate shaft 68a has a coupling 68b provided at a rear end thereof, and an outer edge of the coupling 68b is connected to the flywheel. Furthermore, the intermediate shaft 68a has a drive shaft of the hydraulic driver 64 connected to a front end thereof.

Accordingly, when the engine 60 is driven, rotating power from a crankshaft (output shaft) 60a of the engine 60 is transmitted to the flywheel and causes the flywheel to rotate. As indicated by arrow F1 in FIG. 4, the rotating power from the flywheel is transmitted from the coupling 68b to the intermediate shaft 68a and then transmitted from the intermediate shaft 68a to the drive shaft of the hydraulic driver 64, making it possible to drive the hydraulic driver 64.

Furthermore, as indicated by arrow F2 in FIG. 4, the rotating power from the flywheel is transmitted via the connector 63a to the rotor 63b. Therefore, transmission of the rotating power from the engine 60 to the rotor 63b (connector 63a) allows the motor/generator 63 to function as a generator. On the other hand, supplying electricity stored in the battery 66 to the stator 63c allows the rotor 63b to rotate. As indicated by arrow F3, the rotating power from the rotor 63b can be transmitted to the flywheel via the connector 63a. This makes it possible to cause the motor/generator 63 to function as an electric motor to assist the engine 60.

FIGS. 5 and 6 each show a hydraulic circuit (hydraulic system) of the working machine. FIG. 5 is a hydraulic system of a travel system, and FIG. 6 is a hydraulic system of a work system.

As shown in FIG. 5, the hydraulic system of the travel system causes the traveling devices 4L and 4R to function using hydraulic pressure that occurs when the hydraulic driver 64 is driven. The hydraulic system of the travel system includes the sub-pump P1 which is a hydraulic pump to discharge hydraulic fluid, a first travel motor mechanism 31L, a second travel motor mechanism 31R, and a travel drive mechanism 34.

The sub-pump P1 includes a fixed displacement gear pump. The sub-pump P1 is configured to discharge hydraulic fluid from a tank (hydraulic fluid tank). There is a discharge fluid passage 40, which allows passage of hydraulic fluid, on the discharge side of the sub-pump P1. The discharge fluid passage 40 has a first charge fluid passage 41 connected to the discharge side thereof. The first charge fluid passage 41 extends to reach the travel drive mechanism 34. A portion of the hydraulic fluid discharged from the sub-pump P1 that is used for control may be referred to as a pilot fluid, and the pressure of the pilot fluid may be referred to as a pilot pressure.

The travel drive mechanism 34 drives the first travel motor mechanism 31L and the second travel motor mechanism 31R, and includes a driver circuit (left driver circuit) 34L to drive the first travel motor mechanism 31L and a driver circuit (right driver circuit) 34R to drive the second travel motor mechanism 31R.

The driver circuits 34L and 34R include respective travel pumps 52L and 52R, respective speed change fluid passages 57h and 57i, and a second charge fluid passage 42. The speed change fluid passages 57h and 57i are fluid passages connecting the travel pumps 52L and 52R with travel motors 36L and 36R. The second charge fluid passage 42 is a fluid passage connected to the speed change fluid passages 57h and 57i and supplies hydraulic fluid from the sub-pump P1 to the speed change fluid passages 57h and 57i. Each of the travel pumps 52L and 52R is a swash-plate variable displacement axial pump driven by power from the engine 60. The travel pumps 52L and 52R each include pressure receivers 52a and 52b on which pilot pressure acts, and the swash plate angle is changed by the pilot pressure acting on the pressure receivers 52a and 52b. Changing the swash plate angle makes it possible to change the output of (amount of discharged hydraulic fluid from) the travel pumps 52L and 52R and the direction of discharge of hydraulic fluid. In other words, the travel pumps 52L and 52R, when the swash plate angle thereof is changed, thus change a driving force outputted to the traveling devices 4L and 4R.

The first travel motor mechanism 31L transmits power to a drive shaft of the traveling device 4L provided on the left side of the machine body 2. The second travel motor mechanism 31R transmits power to a drive shaft of the traveling device 4R provided on the right side of the machine body 2. The first travel motor mechanism 31L includes travel motors 36L and 36R and a speed change mechanism.

Each of the travel motors 36L and 36R is, for example, a swash-plate variable displacement axial motor. The travel motor 36L is attached to the motor mounting portion 26 of the left frame portion 21 and transmits power for travel to the traveling device 4L. The travel motor 36R is attached to the motor mounting portion 26 of the right frame portion 20 and transmits power for travel to the traveling device 4R.

Each of the travel motors 36L and 36R is configured to change vehicle speed (rotation) to first speed stage or second speed stage. In other words, the travel motors 36L and 36R are configured to change the driving force for the working machine 1, i.e., the driving force for the traveling devices 4L and 4R.

The speed change mechanism includes a swash plate switching cylinder 38a and a travel switching valve 38b. The swash plate switching cylinder 38a extends and retracts to change the swash plate angle of a corresponding one of the travel motors 36L and 36R. The travel switching valve 38b allows the swash plate switching cylinder 38a to extend/retract in either of two directions, and is a two-way switching valve which achieves switching between a first position 39a and a second position 39b. The travel switching valve 38b is caused to switch between the first and second positions 39a and 39b by a speed change switching valve 44. The speed change switching valve 44 is connected to the discharge fluid passage 40 and is also connected to the travel switching valve 38b of the first travel motor mechanism 31L and the travel switching valve 38b of the second travel motor mechanism 31R. The speed change switching valve 44 is a two-way switching valve which achieves switching between a first position 44a and a second position 44b. When the speed change switching valve 44 is in the first position 44a, the pressure of hydraulic fluid acting on the travel switching valves 38b of the speed change mechanisms is set to a pressure corresponding to a predetermined speed (for example, first speed stage). When the speed change switching valve 44 is in the first position 44a, the pressure of the hydraulic fluid acting on the travel switching valves 38b is set to a pressure corresponding to a speed (second speed stage) higher than the predetermined speed (first speed stage). Thus, when the speed change switching valve 44 is in the first position 44a, each travel switching valve 38b is brought into the first position 39a, causing each swash plate switching cylinder 38a to retract and changing the speed stage of the travel motors 36L and 36R to first speed stage. When the speed change switching valve 44 is in the second position 44b, each travel switching valve 38b is brought into the second position 39b, causing each swash plate switching cylinder 38a to extend and changing the speed stage of the travel motors 36L and 36R to second speed stage. Note that the speed stage of the travel motors 36L and 36R is changed to first speed stage or second speed stage under control by a work controller 70. For example, the work controller 70 is provided with an operation actuator 58 such as a switch (speed change switch) (see FIG. 8). Upon shifting of the operation actuator 58 into first speed stage, the work controller 70 outputs a control signal to deenergize a solenoid of the speed change switching valve 44 to bring the speed change switching valve 44 into the first position 44a. Upon shifting of the operation actuator 58 into second speed stage, the work controller 70 outputs a control signal to energize the solenoid of the speed change switching valve 44 to bring the speed change switching valve 44 into the second position 44b.

As illustrated in FIG. 5, the working machine 1 includes an operation device 53. The operation device 53 is a device for operation of the traveling devices 4L and 4R, i.e., for operation of the first travel motor mechanism 31L, the second travel motor mechanism 31R, and the travel drive mechanism 34. The operation device 53 includes a travel operation actuator 54 and a plurality of operation valves 55 (55a, 55b, 55c, and 55d). The plurality of operation valves 55 (55a, 55b, 55c, and 55d) are travel operation valves.

The travel operation actuator 54 is an operation actuator which is supported on the operation valves 55 and which swings sideways (along the machine body width direction) and along the front-rear direction. The plurality of operation valves 55 are operated by the same travel operation actuator 54, i.e., by a single travel operation actuator 54. The plurality of operation valves 55 function based on the swinging movement of the travel operation actuator 54. Hydraulic fluid (pilot fluid) can be supplied from the sub-pump P1 through the discharge fluid passage 40 to the plurality of operation valves 55. The plurality of operation valves 55 are the operation valve 55a, the operation valve 55b, the operation valve 55c, and the operation valve 55d.

The plurality of operation valves 55 and the travel drive mechanism 34 (travel pumps 52L and 52R) of the travel system are connected by a travel fluid passage 45. The travel fluid passage 45 includes a first travel fluid passage 45a, a second travel fluid passage 45b, a third travel fluid passage 45c, a fourth travel fluid passage 45d, and a fifth travel fluid passage 45e. The first travel fluid passage 45a is a fluid passage connected to the pressure receiver (first pressure receiver) 52a of the travel pump 52L. The second travel fluid passage 45b is a fluid passage connected to the pressure receiver (second pressure receiver) 52b of the travel pump 52L. The third travel fluid passage 45c is a fluid passage connected to the pressure receiver (third pressure receiver) 52a of the travel pump 52R. The fourth travel fluid passage 45d is a fluid passage connected to the pressure receiver (fourth pressure receiver) 52b of the travel pump 52R. The fifth travel fluid passage 45e is a fluid passage which connects the operation valves 55, the first travel fluid passage 45a, the second travel fluid passage 45b, the third travel fluid passage 45c, and the fourth travel fluid passage 45d. The fifth travel fluid passage 45e connects a plurality of shuttle valves 46 and the plurality of operation valves 55 (55a, 55b, 55c, and 55d).

Upon forward (in the direction indicated by arrow A1 in FIG. 5) swinging movement of the travel operation actuator 54, the operation valve 55a is operated, pilot pressure is determined by the operation valve 55a, the determined pilot pressure acts on the pressure receivers 52a of the travel pumps 52L and 52R, and the swash plate of each of the travel pumps 52L and 52R is tilted from a neutral position in a normal rotation direction, thus causing the travel pumps 52L and 52R to discharge hydraulic fluid. It follows that output shafts 35L and 35R of the travel motors 36L and 36R rotate in the normal direction (rotate to cause forward travel) at a speed that is proportional to the amount of the swinging movement of the travel operation actuator 54, and that the working machine 1 travels forward in a straight line.

Upon rearward (in the direction indicated by arrow A2 in FIG. 5) swinging movement of the travel operation actuator 54, the operation valve 55b is operated, pilot pressure is determined by the operation valve 55b, the determined pilot pressure acts on the pressure receivers 52b of the travel pumps 52L and 52R, and the swash plate of each of the travel pumps 52L and 52R is tilted from the neutral position in a reverse rotation direction, thus causing the travel pumps 52L and 52R to discharge hydraulic fluid. It follows that the output shafts 35L and 35R of the travel motors 36L and 36R rotate in the reverse direction (rotate to cause rearward travel) at a speed that is proportional to the amount of the swinging movement of the travel operation actuator 54, and that the working machine 1 travels rearward in a straight line.

Upon rightward (in the direction indicated by arrow A3 in FIG. 5) swinging movement of the travel operation actuator 54, the operation valve 55c is operated, pilot pressure is determined by the operation valve 55c, the determined pilot pressure acts on the pressure receiver 52a of the travel pump 52L and the pressure receiver 52b of the travel pump 52R, and the swash plate of the travel pump 52L is tilted in the normal rotation direction and the swash plate of the travel pump 52R is tilted in the reverse rotation direction. It follows that the output shaft 35L of the travel motor 36L on the left side rotates in the normal direction and the output shaft 35R of the travel motor 36R on the right side rotates in the reverse direction, so that the working machine 1 turns right (makes a spin turn). Upon leftward (in the direction indicated by arrow A4 in FIG. 5) swinging movement of the travel operation actuator 54, the operation valve 55d is operated, pilot pressure is determined by the operation valve 55d, the determined pilot pressure acts on the pressure receiver 52b of the travel pump 52L and the pressure receiver 52a of the travel pump 52R, and the swash plate of the travel pump 52L is tilted in the reverse rotation direction and the swash plate of the travel pump 52R is tilted in the normal rotation direction. It follows that the output shaft 35L of the travel motor 36L on the left side rotates in the reverse direction and the output shaft 35R of the travel motors 36R on the right side rotates in the normal direction, so that the working machine 1 turns left (makes a spin turn).

Upon diagonal swinging movement of the travel operation actuator 54, the difference between the pilot pressure acting on the pressure receivers 52a and the pilot pressure acting on the pressure receivers 52b determines the direction and speed of rotation of the output shafts 35L and 35R of the travel motor 36L on the left side and the travel motor 36R on the right side, and the working machine 1 turns right (makes a right pivot turn) or turns left (makes a left pivot turn) while traveling forward or rearward.

The working machine 1 may include an anti-stall control valve 48. The anti-stall control valve 48 is disposed in the fluid passage (discharge fluid passage 40) between the plurality of operation valves 55 (55a, 55b, 55c, and 55d) and the sub-pump P1. The anti-stall control valve 48 is a proportional solenoid valve, and the degree of opening of the anti-stall control valve 48 is variable. The anti-stall control valve 48 is configured to determine, according to a decrease $\Delta E1$ in rotation speed of the engine 60 (engine speed E1), pilot pressure (primary pilot pressure) which acts on the plurality of operation valves 55 (55a, 55b, 55c, and 55d). The rotation speed of the engine can be detected by an engine speed E1 sensor 91. The engine speed E1 detected by the sensor 91 is inputted into the work controller 70.

Figure 7:
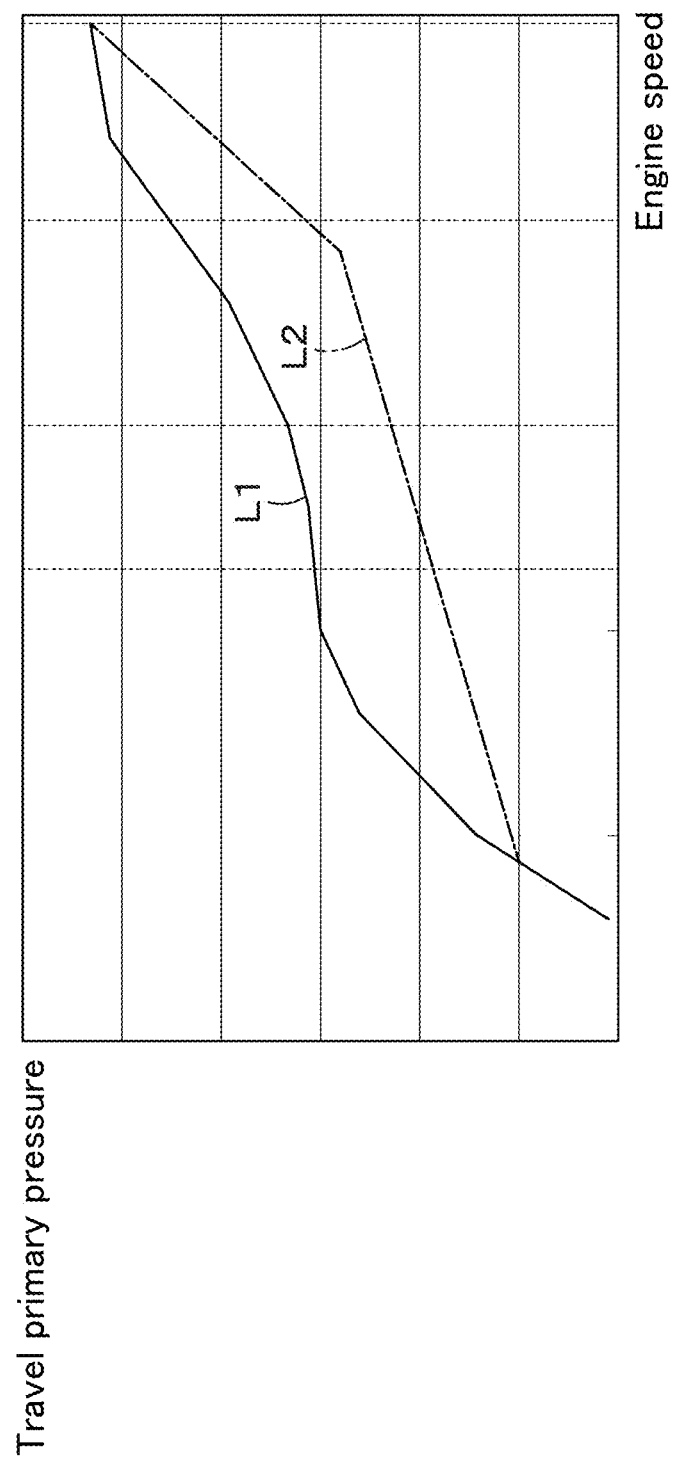
FIG. 7 shows a relationship between engine speed, travel primary pressure, and setting lines.

FIG. 7 shows a relationship between engine speed, travel primary pressure (primary pilot pressure), and setting lines L51 and L52. The setting line L51 represents a relationship between engine speed E1 and travel primary pressure where the decrease $\Delta E1$ is less than a predetermined value (less than anti-stall reference value). The setting line L52 represents a relationship between engine speed E1 and travel primary pressure where the decrease $\Delta E1$ is equal to or greater than the anti-stall reference value.

When the decrease $\Delta E1$ is less than the anti-stall reference value, the work controller 70 adjusts the degree of opening of the anti-stall control valve 48 so that the relationship between the engine speed E1 and the travel primary pressure matches a reference pilot pressure represented by the setting line L51. When the decrease $\Delta E1$ is equal to or greater than the anti-stall reference value, the work controller 70 adjusts the degree of opening of the anti-stall control valve 48 so that the relationship between the engine speed E1 and the travel primary pressure matches the setting line L52 which is below the reference pilot pressure. The travel primary pressure at a certain engine speed E1 is lower on the setting line L52 than on the setting line L51. That is, when focus is put on a single engine speed E1, the travel primary pressure on the setting line L52 is set to be lower than the travel primary pressure on the setting line L51. Accordingly, with the control based on the setting line L52, the pressure of hydraulic fluid entering the operation valves 55 is kept low (pilot pressure is kept low). It follows that the swash plate angle of the travel pumps 52L and 52R is adjusted, the load on the engine is reduced, and the engine is prevented from stalling. Note that, although FIG. 7 shows a single setting line L52, a plurality of setting lines L52 may be present. For example, the setting lines L52 may be set for respective engine speeds E1. Data indicative of the setting line L51 and the setting line L52, control parameters such as functions, or the like are preferably stored in the work controller 70.

As illustrated in FIG. 6, the hydraulic system of the work system causes the working device 3 and/or the like to function. The hydraulic system of the work system is a system to cause the working device 3 to function using hydraulic pressure that occurs when the hydraulic driver 64 is driven. The hydraulic system of the work system includes a plurality of control valves 51 and a main pump P2 which is a hydraulic pump that discharges hydraulic fluid. The main pump P2 is located at a different position from the sub-pump P1, and includes a small displacement gear pump. The main pump P2 is configured to discharge hydraulic fluid from a hydraulic fluid tank. In particular, the main pump P2 mainly discharges hydraulic fluid to activate a hydraulic actuator.

There is a fluid passage 51f on the discharge side of the main pump P2. The fluid passage 51f has the plurality of control valves 51 connected thereto. The plurality of control valves 51 include a boom control valve 51a, a bucket control valve 51b, and an auxiliary control valve 51c. The boom control valve 51a is a valve to control the boom cylinders 14, the bucket control valve 51b is a valve to control the working tool cylinders 15, and the auxiliary control valve 51c is a valve to control a hydraulic actuator of the auxiliary attachment.

The booms 10 and the working tool 11 can be operated using a work operation actuator 37 of an operation device 43. The work operation actuator 37 is an operation actuator which is supported on a plurality of operation valves 59 and which swings sideways (along the machine body width direction) and along the front-rear direction. The operation valves 59 provided at the bottom of the work operation actuator 37 can be operated by tilting operation of the work operation actuator 37.

The plurality of operation valves 59 and the plurality of control valves 51 are connected to each other by a plurality of work fluid passages 47 (47a, 47b, 47c, and 47d). Specifically, the operation valve 59a is connected to the boom control valve 51a via the work fluid passage 47a. The operation valve 59b is connected to the boom control valve 51a via the work fluid passage 47b. The operation valve 59c is connected to the bucket control valve 51b via the work fluid passage 47c. The operation valve 59d is connected to the bucket control valve 51b via the work fluid passage 47d. The plurality of the operation valves 59a to 59d are each configured to determine, according to the operation of the work operation actuator 37, the pressure of hydraulic fluid to be outputted.

Upon forward tilting movement of the work operation actuator 37, the operation valve 59a is operated to output pilot pressure. The pilot pressure acts on a pressure receiver of the boom control valve 51a and hydraulic fluid having entered the boom control valve 51a is supplied to the rod side of each of the boom cylinders 14, thus lowering the booms 10.

Upon rearward tilting movement of the work operation actuator 37, the operation valve 59b is operated to output pilot pressure. The pilot pressure acts on another pressure receiver of the boom control valve 51a and hydraulic fluid having entered the boom control valve 51a is supplied to the bottom side of each of the boom cylinders 14, thus raising the booms 10.

That is, the boom control valve 51a is configured to control the flow rate of hydraulic fluid flowing to the boom cylinders 14 according to the pressure of hydraulic fluid determined by the operation of the work operation actuator 37 (pilot pressure determined by the operation valve 59a, pilot pressure determined by the operation valve 59b).

Upon rightward tilting movement of the work operation actuator 37, the operation valve 59c is operated and pilot pressure acts on a pressure receiver of the bucket control valve 51b. It follows that the bucket control valve 51b functions to cause the working tool cylinders 15 to extend, and the working tool 11 performs a dump action at a speed proportional to the amount of the tilting movement of the work operation actuator 37.

Upon leftward tilting movement of the work operation actuator 37, the operation valve 59d is operated and pilot fluid acts on another pressure receiver of the bucket control valve 51b. It follows that the bucket control valve 51b functions to cause the working tool cylinders 15 to retract, and the working tool 11 performs a scoop action at a speed proportional to the amount of the tilting movement of the work operation actuator 37.

That is, the bucket control valve 51b is configured to control the flow rate of hydraulic fluid flowing to the working tool cylinders 15 according to the pressure of hydraulic fluid determined by the operation of the work operation actuator 37 (pilot pressure determined by the operation valve 59c, pilot pressure determined by the operation valve 59d). That is, the operation valves 59a, 59b, 59c, and 59d change the pressure of hydraulic fluid according to the operation of the work operation actuator 37, and supply the hydraulic fluid having been subjected to pressure change to control valves such as the boom control valve 51a, the bucket control valve 51b, and/or the auxiliary control valve 51c.

Figure 8:
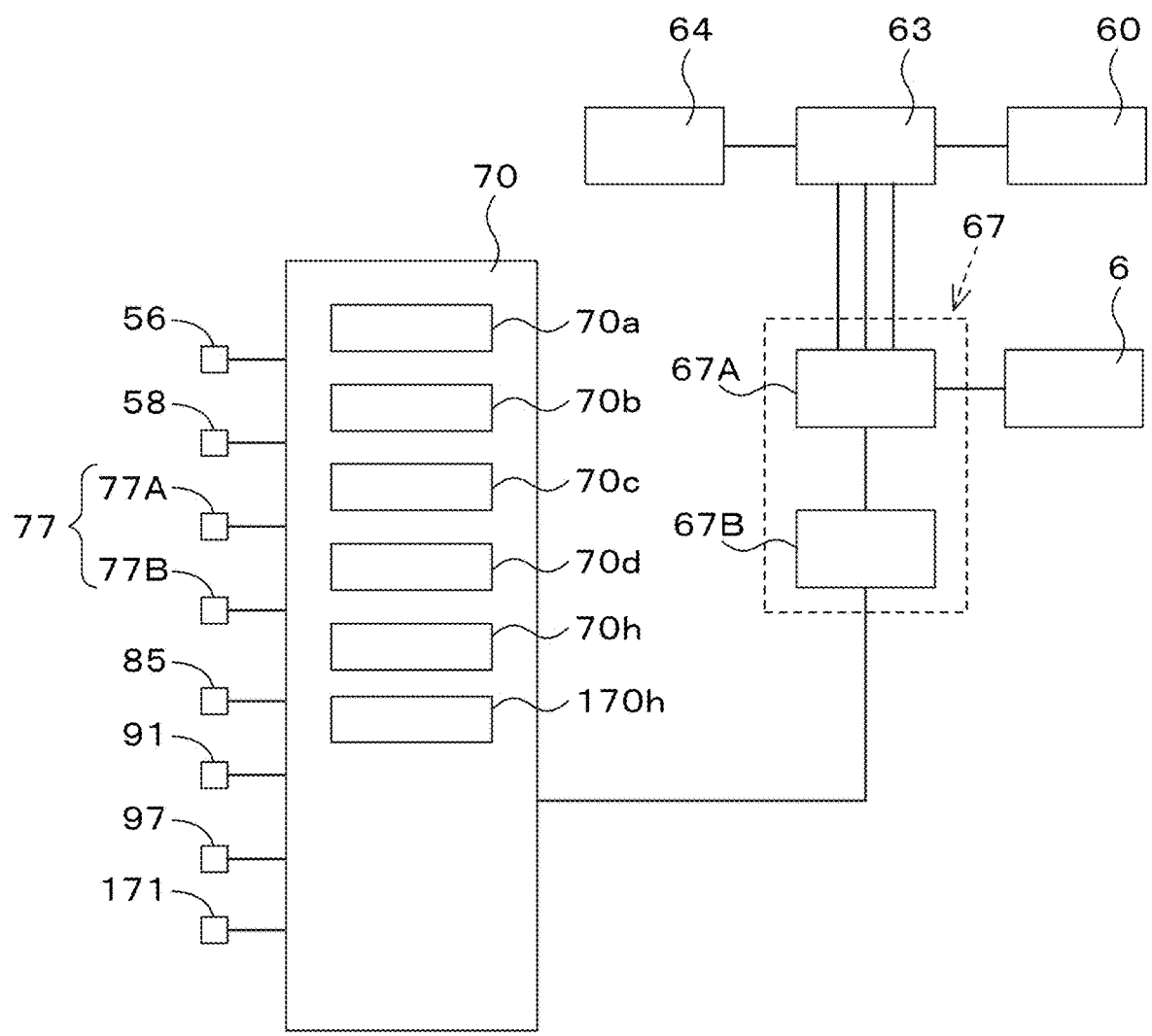
FIG. 8 is a control block diagram of the working machine.

The auxiliary attachment can be operated using a switch 56 provided in the vicinity of the operator's seat 7 (see FIG. 8). The switch 56 includes, for example, a swingable seesaw switch, a slidable slide switch, or a push switch that can be pressed. The operation of the switch 56 is inputted into the work controller 70. A first solenoid valve 56a and a second solenoid valve 56b, each including a solenoid valve or the like, open according to the operation amount of the switch 56. It follows that pilot fluid is supplied to the auxiliary control valve 51c connected to the first solenoid valve 56a and the second solenoid valve 56b, and an auxiliary actuator of the auxiliary attachment is activated by hydraulic fluid supplied from the auxiliary control valve 51c.

The above-described preferred embodiment includes a configuration in which the front or rear swinging movement of a single work operation actuator 37 raises or lowers the booms 10, and the leftward or rightward swinging movement of the single work operation actuator 37 operates the working tool 11 such as a bucket. However, the following configuration may be included instead. At least a pair of work operation actuators 37 are provided, swinging movement of one of the work operation actuators 37 raises or lowers the booms 10, and swinging movement of the other of the work operation actuators 37 activates the working tool 11. In such a case, the operation valves 59a and 59b determine the pilot pressure according to the swinging movement of the one of the work operation actuators 37, and the operation valves 59c and 59d determine the pilot pressure according to the swinging movement of the other of the work operation actuators 37. That is, the booms 10 and the working tool 11 may be operated concurrently (a combined action may be performed).

Note that the operation amount of an operation actuator (work operation actuator 37, travel operation actuator 54) can be detected by an operation detecting device 77. The operation detecting device 77 is connected to the work controller 70 (described later). The operation detecting device 77 includes a first operation detecting device 77A and a second operation detecting device 77B. The first operation detecting device 77A detects the operation amount of the work operation actuator 37 (work operation amount). The second operation detecting device 77B detects the operation amount of the travel operation actuator 54 (travel operation amount). The first operation detecting device 77A and the second operation detecting device 77B are each, for example, a position sensor to detect the position of the operation actuator.

FIG. 8 is a control block diagram of the working machine 1. As illustrated in FIG. 8, the electricity controller 67 and the work controller 70 are connected to each other. The electricity controller 67 includes the inverter 67A and the inverter control unit 67B. The inverter 67A includes, for example, a plurality of switching elements, and, for example, converts direct current into alternating current by, for example, turning ON and OFF the switching elements. The inverter 67A is connected to the motor/generator 63 and the battery 66. The inverter control unit 67B includes a CPU, an electrical/electronic circuit, and/or the like. By outputting a predetermined signal to the inverter control unit 67B, the motor/generator 63 is caused to function as a motor or function as a generator. The amount of electricity stored in the battery 66 (remaining battery power) can be detected by the battery level sensor 97 of the battery 66.

The work controller 70 is a device to perform various types of control relating to the working machine, and includes a CPU, an electrical/electronic circuit, and/or the like. The work controller 70 performs control relating to hydraulic pressure (hydraulic fluid) (such control is hydraulic pressure control). In the hydraulic pressure control, the work controller 70 energizes and deenergizes the solenoids of the speed change switching valve 44, the first solenoid valve 56a, and the second solenoid valve 56b, as described earlier. The work controller 70 also is configured or programmed to act as a controller to control the electricity controller 67. The work controller 70 outputs an assist command to the inverter control unit 67B, and the inverter control unit 67B causes the motor/generator 63 to function as a motor. The work controller 70 outputs an electricity generation command to the inverter control unit 67B, and the inverter control unit 67B causes the motor/generator 63 to function as a generator. That is, the work controller 70 controls the motor/generator 63 to perform an assisting action in which the motor/generator 63 assists the engine in driving and an electricity generating action in which the motor/generator 63 functions as a generator to generate electricity using power from the engine 60. Note that the work controller 70 sends, to the electricity controller 67, settings and commands regarding motoring torque in the case of the assisting action of the motor/generator 63 and regenerative torque in the case of the electricity generating action of the motor/generator 63.

When the motor/generator 63 performs the assisting action, power from the engine 60 and the motor/generator 63 is transmitted to the hydraulic driver 64. When the motor/generator 63 performs the electricity generating action, power from the engine 60 is transmitted to the hydraulic driver 64, and electricity generated by the motor/generator 63 is stored in the battery 66. The motor/generator 63 is driven by the electricity stored in the battery 66.

Note that, although the work controller 70 and the electricity controller 67 are separate devices in the above-described preferred embodiment, the work controller 70 and the electricity controller 67 may be a single device. The above-described preferred embodiment does not impose or imply any limitation.

The work controller 70 includes a storage unit 70a, a motoring torque setting unit 70b, a regenerative torque setting unit 70c, and an action controller 70d. The storage unit 70a includes a nonvolatile memory or the like. The motoring torque setting unit 70b, the regenerative torque setting unit 70c, and the action controller 70d include electrical/electronic circuit(s) of the work controller 70, program(s) stored in the CPU and/or the like of the work controller 70, and/or the like. The storage unit 70a, the motoring torque setting unit 70b, the regenerative torque setting unit 70c, and the action controller 70d may be provided in the electricity controller 67.

Figure 9:
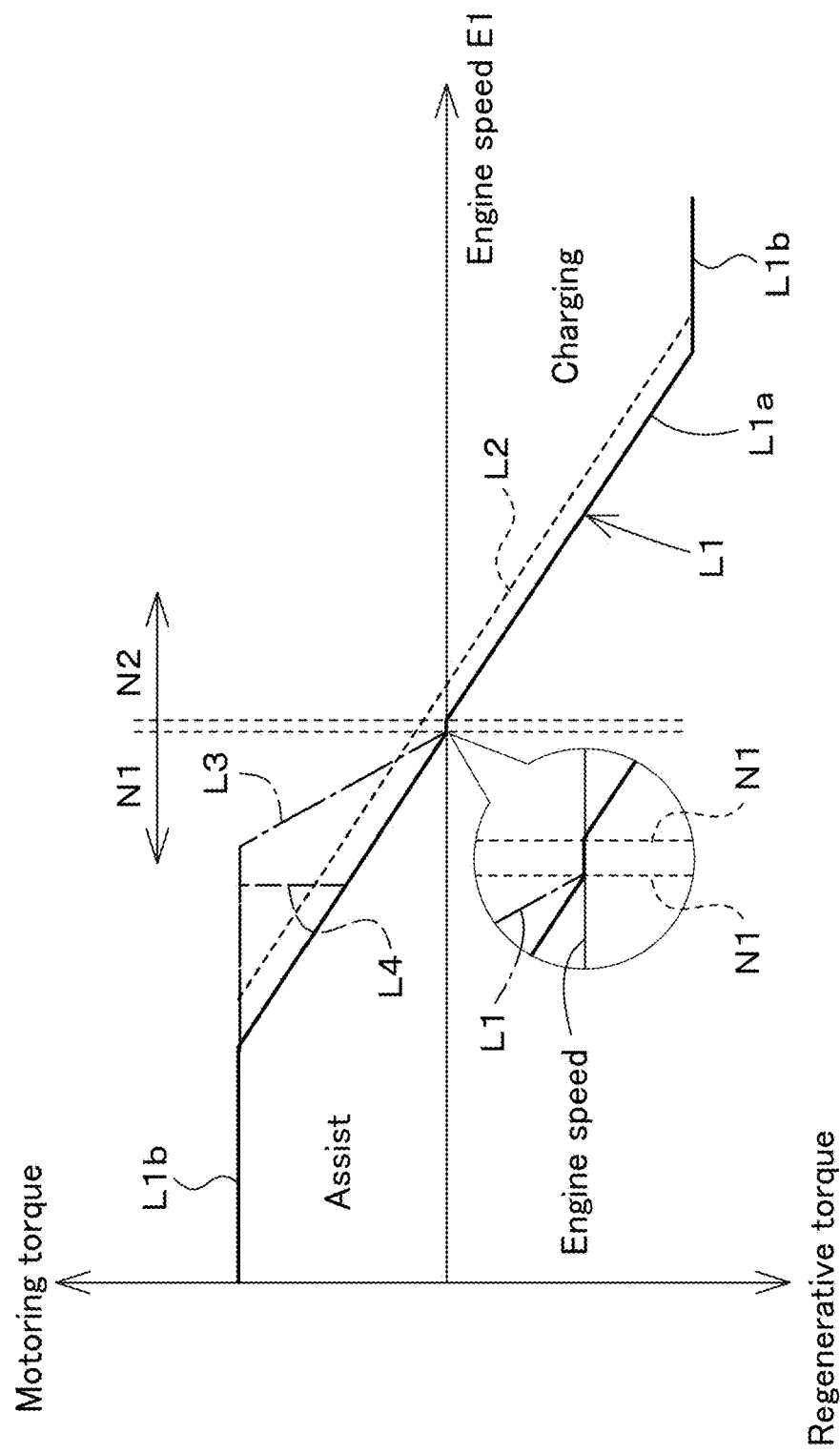
FIG. 9 shows an example of a control map.

The storage unit 70a stores therein control information for use when the motor/generator 63 performs the assisting action or charging action e.g., a control map as shown in FIG. 9. The control map indicates a relationship between the rotation speed of the engine 60 (engine speed E1) and switching between the assisting action and the charging action (switching between actions), a relationship between engine speed E1 and motoring torque in the case of the assisting action, and a relationship between engine speed E1 and regenerative torque in the case of the charging action. Note that, although the control information is a control map in the above-described preferred embodiment, the relationship between engine speed E1 and switching between actions, the relationship between engine speed E1 and motoring torque in the case of the assisting action, and the relationship between engine speed E1 and regenerative torque in the case of the charging action may be represented by a control table, parameters, functions, and/or the like, and the above-described preferred embodiment does not impose or imply any limitation.

The motoring torque setting unit 70b sets a motoring torque for the assisting action. As shown in FIG. 9, the motoring torque setting unit 70b refers to control information such as a control map stored in the storage unit 70a, and sets the motoring torque to that corresponding to engine speed E1 using, for example, a standard line L1.

The regenerative torque setting unit 70c sets a regenerative torque for the electricity generating action. As shown in FIG. 9, similarly to the motoring torque setting unit 70b, the regenerative torque setting unit 70c refers to control information and sets the regenerative torque to that corresponding to the engine speed E1 using, for example, the standard line L1. Note that the standard line L1 includes a sloping line L1a in which the torque changes with engine speed E1, and a constant line L1b in which the torque is constant regardless of engine speed E1.

When the rotation speed of the engine is equal to or less than a first rotation speed N1, the action controller 70d causes the assisting action to be performed by outputting the motoring torque set by the motoring torque setting unit 70b to the electricity controller 67, and, when the rotation speed of the engine is equal to or greater than a second rotation speed N2 which is greater than the first rotation speed, the action controller 70d causes the electricity generating action to be performed by outputting the regenerative torque set by the regenerative torque setting unit 70c to the electricity controller 67.

Figure 10A:
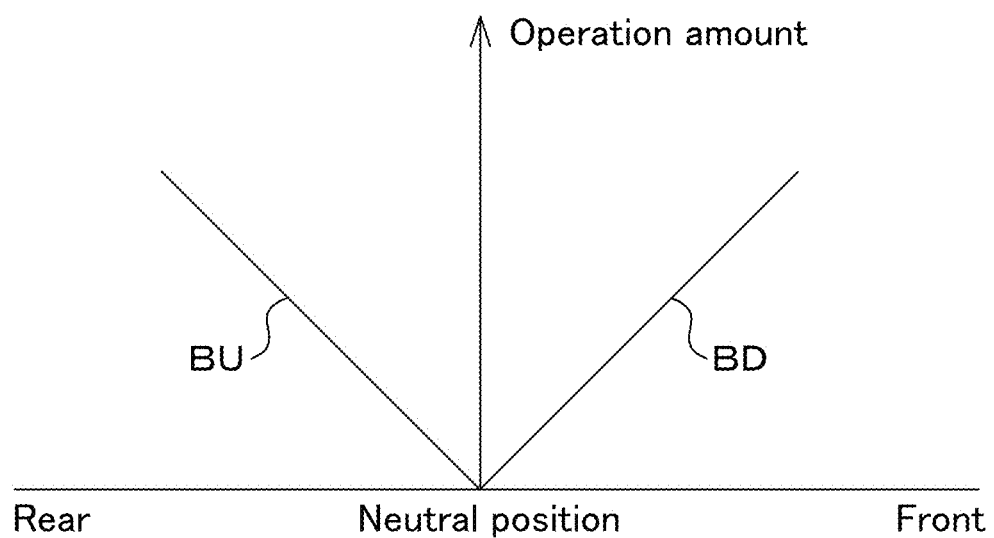
FIG. 10A shows a work operation amount BD and a work operation amount BU detected when a work operation actuator is operated.

The working machine 1 is configured such that the first rotation speed N1 and the second rotation speed N2, based on which switching to the assisting action or the electricity generating action is performed, can be changed when the work operation actuator 37 is operated. FIG. 10A shows a work operation amount BD and a work operation amount BU detected by the first operation detecting device 77A when the work operation actuator 37 is operated forward or rearward (when the boom cylinders 14 are caused to extend or retract). The work operation amount BD represents the operation amount detected when the boom cylinders 14 are caused to retract, i.e., the booms 10 are lowered, and the work operation amount BU represents the operation amount detected when the boom cylinders 14 are caused to extend, i.e., the booms 10 are raised.

Figure 10B:
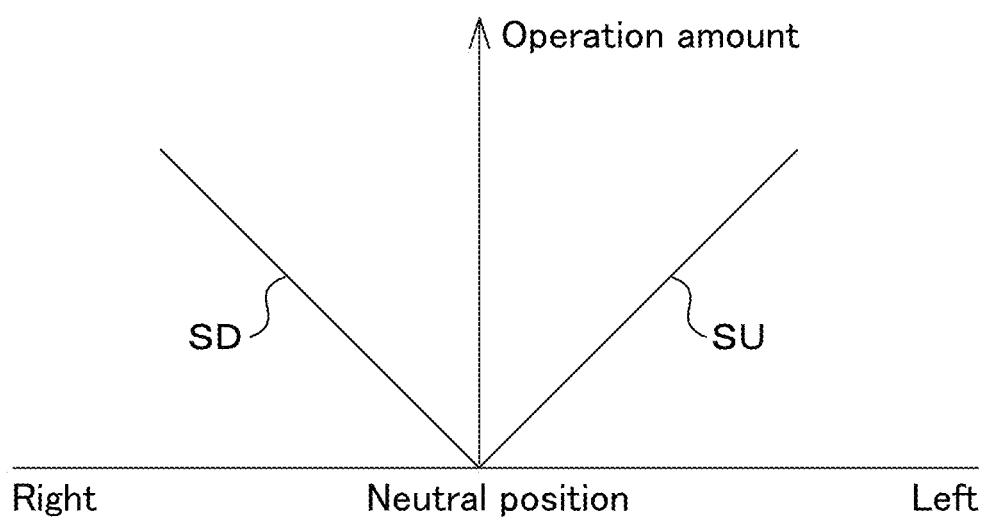
FIG. 10B shows a work operation amount SU and a work operation amount SD detected when the work operation actuator is operated.

FIG. 10B shows a work operation amount SU and a work operation amount SD detected by the second operation detecting device 77B when the work operation actuator 37 is operated leftward or rightward (when the working tool cylinders 15 are caused to extend or retract). The work operation amount SU represents the operation amount detected when the working tool cylinders 15 are caused to retract, i.e., the distal end of the working tool 11 is raised, and the work operation amount SD represents the operation amount detected when the working tool cylinders 15 are caused to extend, i.e., when the distal end of the working tool 11 is lowered. The work operation amounts BD, BU, SU, and SD each gradually increases as the work operation actuator 37 is tilted from the neutral position.

As illustrated in FIG. 8, the work controller 70 includes a speed controller 70h. The speed controller 70h includes electrical/electronic circuit(s) of the work controller 70, program(s) stored in the CPU and/or the like of the work controller 70, and/or the like. The speed controller 70h may be provided in the electricity controller 67.

The speed controller 70h changes the first rotation speed N1 and the second rotation speed N2 according to the work operation amounts BD, BU, SU, and/or SD of the work operation actuator 37.

Figure 11A:
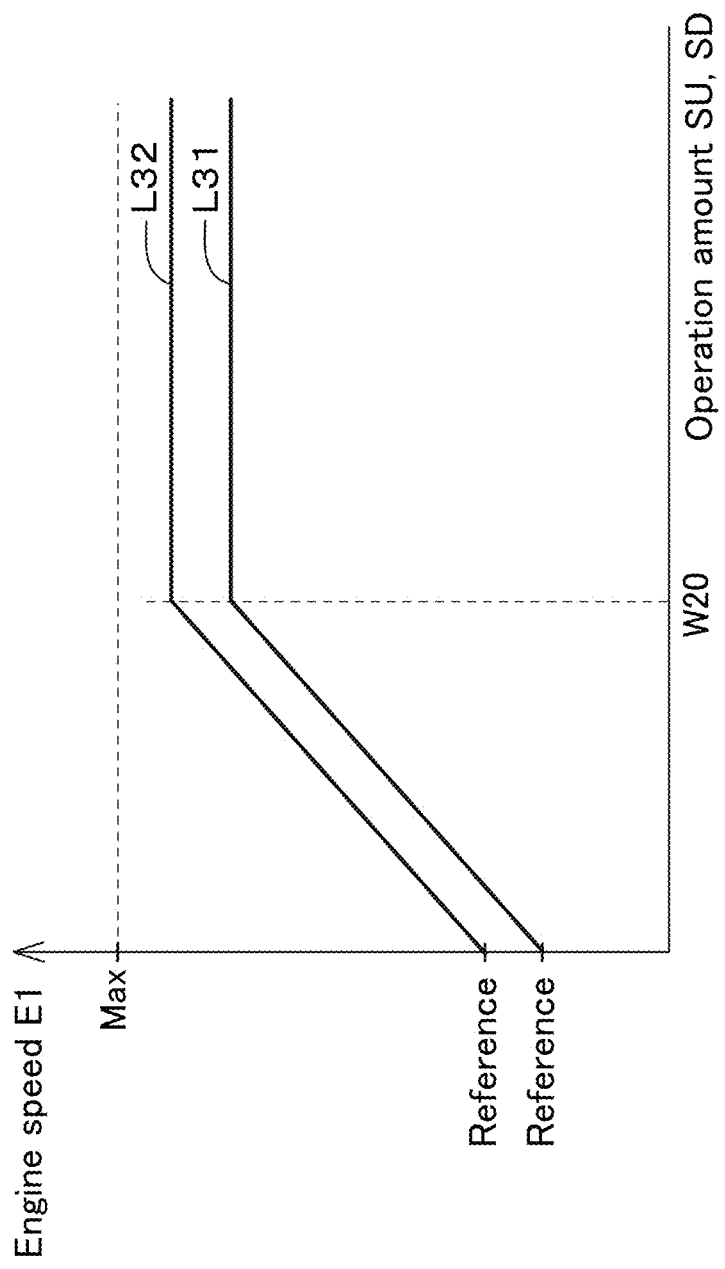
FIG. 11A shows examples of first switching lines L31 and L32.

As shown in FIG. 11A, the speed controller 70h has switching information (first switching lines L31 and L32) indicating a relationship between the work operation amounts SU and SD and the first rotation speed N1 and indicating a relationship between the work operation amounts SU and SD and the second rotation speed N2. Upon operation of the work operation actuator 37, the speed controller 70h changes the first rotation speed N1 and the second rotation speed N2 to values represented by the first switching lines L31 and L32. The first switching line L31 is a line based on which the first rotation speed N1 is set, and the second switching line L32 is a line based on which the second rotation speed N2 is set.

As indicated by the first switching lines L31 and L32 in FIG. 11A, when the work operation actuator 37 has not been operated and is in neutral position, the speed controller 70h sets the first rotation speed N1 and the second rotation speed N2 each to a reference engine speed E1. As indicated by the first switching lines L31 and L32, when the work operation actuator 37 is operated, the first rotation speed N1 and the second rotation speed N2 are gradually increased with the work operation amount SU or SD. Furthermore, as indicated by the first switching lines L31 and L32, when the work operation amount SU or SD has exceeded a predetermined value W20, the speed controller 70h sets the first rotation speed N1 and the second rotation speed N2 each to a fixed value.

Figure 11B:
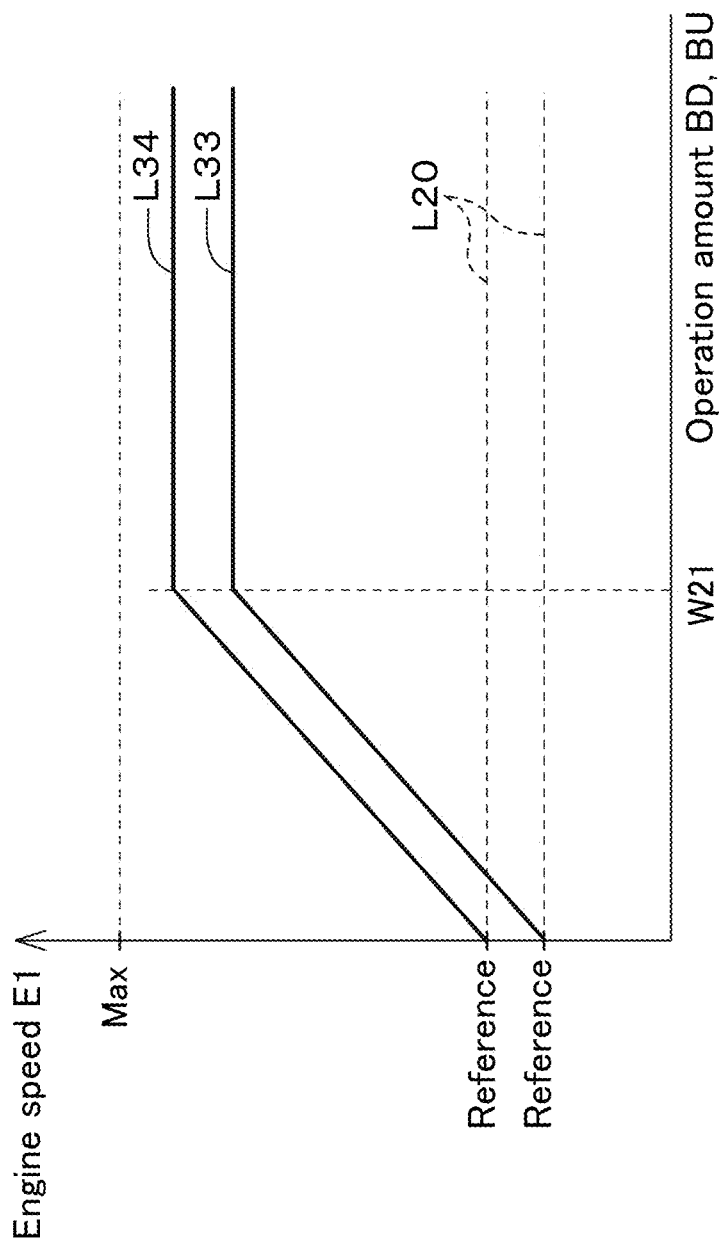
FIG. 11B shows examples of second switching lines L33 and L34.

As shown in FIG. 11B, the speed controller 70h has switching information (second switching lines L33 and L34) indicating a relationship between the work operation amounts BD and BU and the first rotation speed N1 and indicating a relationship between the work operation amounts BD and BU and the second rotation speed N2. Upon operation of the work operation actuator 37, the speed controller 70h changes the first rotation speed N1 and the second rotation speed N2 to values represented by the second switching lines L33 and L34. The second switching line L33 is a line based on which the first rotation speed N1 is set, and the second switching line L34 is a line based on which the second rotation speed N2 is set.

As indicated by the second switching lines L33 and L34 in FIG. 11B, when the work operation actuator 37 has not been operated and is in neutral position, the speed controller 70h sets the first rotation speed N1 and the second rotation speed N2 each to a reference engine speed E1. As indicated by the second switching lines L33 and L34, when the work operation actuator 37 is operated, the first rotation speed N1 and the second rotation speed N2 are gradually increased with the work operation amount BD or BU. Furthermore, as indicated by the second switching lines L33 and L34, when the work operation amount BD or BU has exceeded a predetermined value W21, the speed controller 70h sets the first rotation speed N1 and the second rotation speed N2 each to a fixed value.

Note that, although the first rotation speed N1 and the second rotation speed N2 are increased with the work operation amount BU even when the boom cylinders 14 are caused to extend (when the booms 10 are raised) in the above-described preferred embodiment, the following operation may be used as indicated by lines L20 in FIG. 11B. Upon operation to raise the booms 10, the first rotation speed N1 and the second rotation speed N2 are each fixed at a reference value and do not change with the work operation amount BU, and, when the booms 10 are lowered, the first rotation speed N1 and the second rotation speed N2 are increased with the work operation amount BD.

Furthermore, when a plurality of the work operation actuators 37 are provided and the booms 10 and the working tool 11 can be operated separately (combined action can be performed), the speed controller 70h fixes the first rotation speed N1 and the second rotation speed N2 each at a reference value and do not change the first rotation speed N1 or the second rotation speed N2 during the combined action.

Figure 12A:
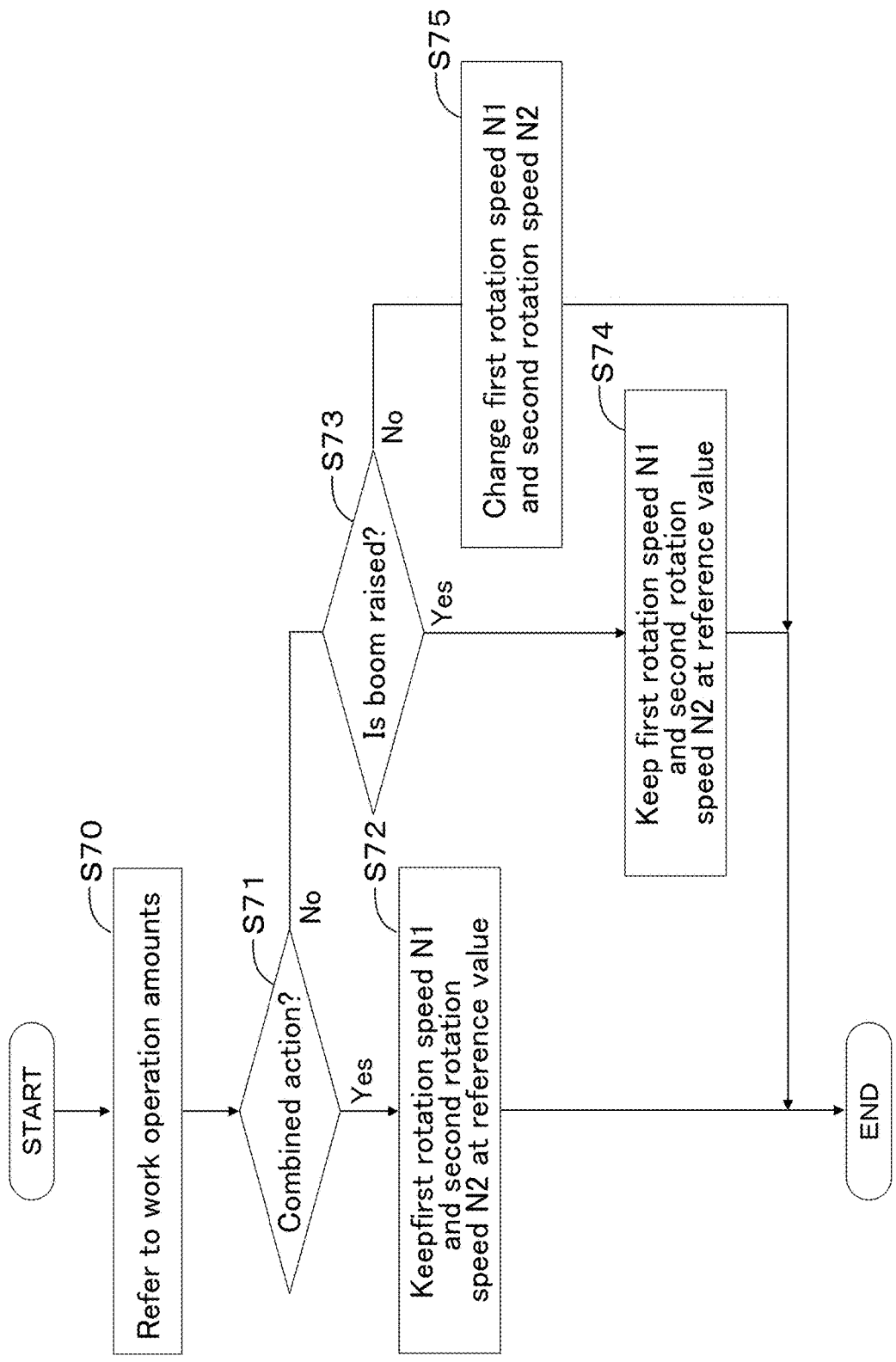
FIG. 12A shows an action of changing a first rotation speed N1 and a second rotation speed N2 when the work operation actuator is operated.
Figure 12B:
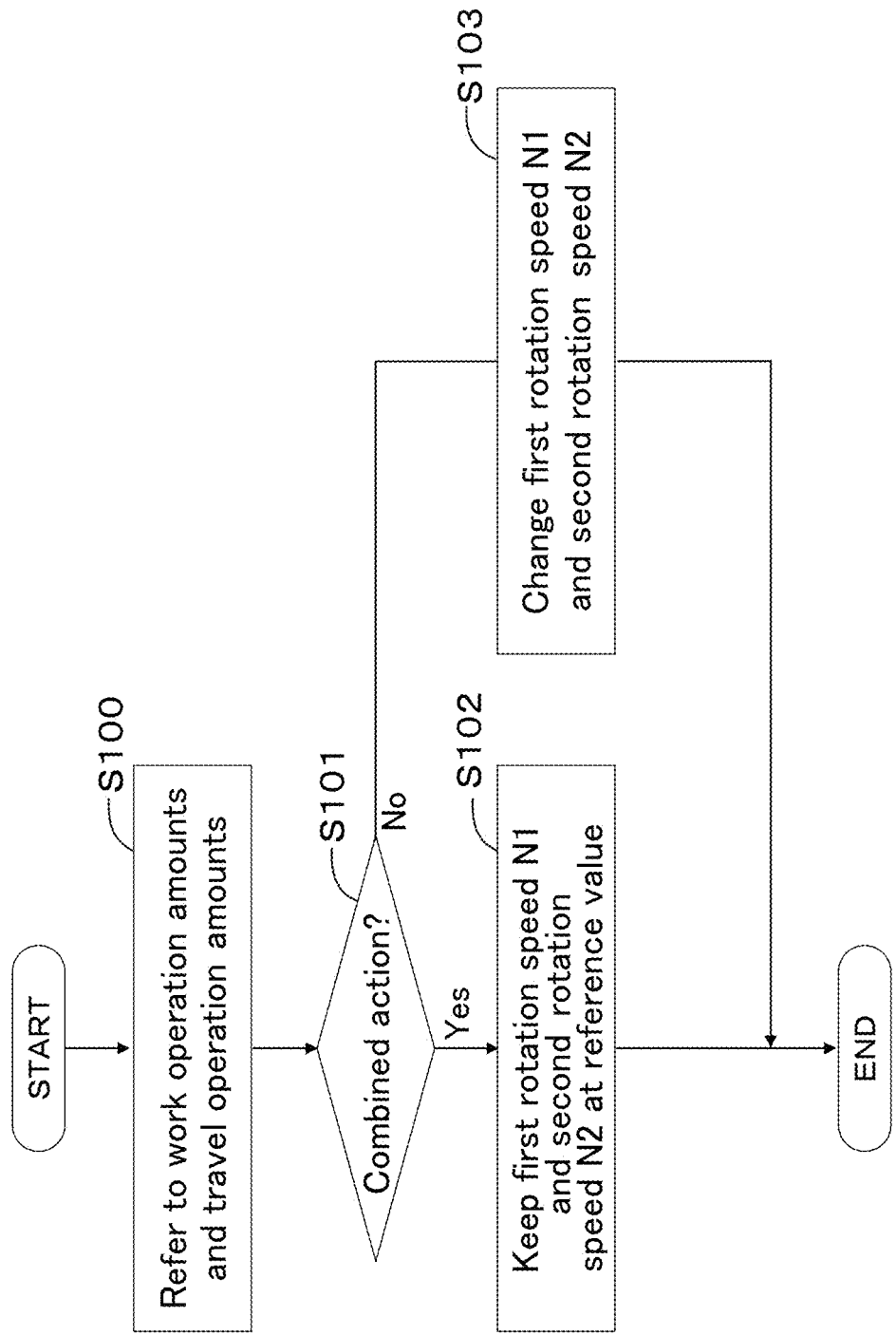
FIG. 12B shows an action of changing the first rotation speed N1 and the second rotation speed N2 when the work operation actuator and a travel operation actuator are operated.

FIGS. 12A and 12B show the action of changing the first rotation speed N1 and the second rotation speed N2 in the case where the operation actuator is operated.

As shown in FIG. 12A, the speed controller 70h refers to the work operation amounts BD, BU, SU and SD (S70). The speed controller 70h determines whether or not a combined action is performed (S71). For example, the speed controller 70h determines that a combined action is performed when both the work operation amount SU or SD and the work operation amount BD or BU are nonzero or when both the work operation amount SU or SD and the work operation amount BD or BU are greater than a predetermined operation amount (Yes in S71). If it is determined that a combined action is performed, the speed controller 70h keeps the first rotation speed N1 and the second rotation speed N2 each at a reference value (S72). The speed controller 70h determines whether or not the booms 10 are raised (S73). If the speed controller 70h determines that the work operation amount BU is equal to or greater than a predetermined amount and that the booms 10 are raised (Yes in S73), the speed controller 70h keeps the first rotation speed N1 and the second rotation speed N2 each at a reference value (S74). If it is determined that the booms 10 are not raised (No in S73), the speed controller 70h changes the first rotation speed N1 and the second rotation speed N2 according to the work operation amounts BD, SU and/or SD (S75). Note that, when the work operation amounts BD, BU, SU and SD are zero, the speed controller 70h keeps the first rotation speed N1 and the second rotation speed N2 each at a reference value.

In FIG. 12A, the first rotation speed N1 and the second rotation speed N2 are not changed and each kept at a reference value when the booms 10 are raised. However, instead of this, the first rotation speed N1 and the second rotation speed N2 may be changed with the work operation amounts BD, BU, SU and/or SD regardless of the action of the booms 10.

Furthermore, the following operation may be used. When the remaining power of the battery 66 is less than a predetermined remaining power, the speed controller 70h keeps the first rotation speed N1 and the second rotation speed N2 each at a reference value regardless of the values of the work operation amounts BD, BU, SU and SD, i.e., even if the work operation actuator 37 is operated.

Although both the first rotation speed N1 and the second rotation speed N2 are changed according to the work operation amounts BD, BU, SU, and/or SD in the above-described preferred embodiment, either the first rotation speed N1 or the second rotation speed N2 may be changed.

Furthermore, the slope of the first switching lines L31 and L32 and the second switching lines L33 and L34, i.e., the amount of increase in the first rotation speed N1 or the second rotation speed N2 relative to the work operation amount BD or BU or the work operation amount SU or SD, may be set according to the operation amount of a setting operation actuator such as a slide switch or a rotary switch.

In the above-described preferred embodiment, the speed controller 70h fixes the first rotation speed N1 and the second rotation speed N2 each at a reference value and does not change the first rotation speed N1 or the second rotation speed N2 in the case of a combined action in which the booms 10 and the working tool 11 are operated separately. However, the first rotation speed N1 and the second rotation speed N2 may each be fixed at a reference value in the case of a combined action in which the work system and the travel system are operated concurrently. Specifically, the first rotation speed N1 and the second rotation speed N2 may be set according to the work operation amount BD or BU or the work operation amount SU or SD of the work operation actuator 37 and a travel operation amount ST1 or ST2 of the travel operation actuator 54. Note that, as will be described later, each of the travel operation amounts ST1 and ST2 is the operation amount for making a turn (spin turn, pivot turn).

As shown in FIG. 12B, the speed controller 70h refers to the work operation amounts BD, BU, SU, and SD and the travel operation amounts ST1 and ST2 (S100). The speed controller 70h determines whether or not a combined action is performed (S101). For example, the speed controller 70h determines that a combined action is performed when both the work operation amount BD or BU or the work operation amount SU or SD and the travel operation amount ST1 or ST2 are nonzero (Yes in S101). When it is determined that a combined action is performed, the speed controller 70h keeps the first rotation speed N1 and the second rotation speed N2 each at a reference value (S102). In particular, in the case where the work operation amount BD is nonzero and the booms 10 are raised and where the travel operation amount ST1 or ST2 is more than zero and the machine body 2 is making a turn, the speed controller 70h keeps the first rotation speed N1 and the second rotation speed N2 each at a reference value.

If it is determined that an action other than the combined action is performed (No in S101), the speed controller 70h changes the first rotation speed N1 and the second rotation speed N2 according to the work operation amounts BD, BU, SU, and/or SD (S103).

A working machine 1 according to a preferred embodiment of the present invention includes a machine body 2, an engine 60, a motor/generator 63, a working device 3, a work operation actuator 37 for operation of the working device 3, an action controller 70d to cause the assisting action to be performed when an engine speed E1 is equal to or less than a first rotation speed N1 and cause the electricity generating action to be performed when the engine speed E1 is equal to or greater than a second rotation speed N2, the second rotation speed N2 being greater than the first rotation speed N1, and a speed controller 70h to change the first rotation speed N1 or the second rotation speed N2 according to a work operation amount BD, BU, SU or SD of the work operation actuator 37. This makes it possible to change the point in time at which the assisting action or the electricity generating action is started (switching position) relative to the engine speed E1, according to the work operation amounts BD, BU, SU and SD of the work operation actuator 37 operated to cause the working device 3 to function. Accordingly, it is possible to flexibly change output depending on work.

The working device 3 includes a boom 10 swingably provided on the machine body 2, a boom cylinder 14 to swing the boom 10, a working tool 11 swingably provided on the boom 10, and a working tool cylinder 15 to swing the working tool 11, and the speed controller 70h makes a change of the first rotation speed N1 or the second rotation speed N2 according to the work operation amount SU or SD of the work operation actuator 37 operated to activate the working tool cylinder 15. This makes it possible to change the combined output of the engine 60 and the motor/generator 63 according to the operation, when work is done with the working tool 11 such as a bucket.

When the work operation actuator 37 is operated to activate the boom cylinder 14 and the working tool cylinder 15, the speed controller 70h does not make the change of the first rotation speed N1 or the second rotation speed N2 according to the work operation amount BD, BU, SU, or SD. With this configuration, when there is high load, e.g., when the boom 10 and the working tool 11 are operated concurrently, neither the first rotation speed N1 for the assisting action nor the second rotation speed N2 for the electricity generating action is changed, thus making it possible to perform operation using the work operation actuator 37 while balancing between the assisting action and the electricity generating action.

When the work operation actuator 37 is operated to activate the boom cylinder 14 to raise the boom 10, the speed controller 70h does not make the change of the first rotation speed N1 or the second rotation speed N2 according to the work operation amount BU. With this configuration, when there is high load, e.g., when the boom 10 is raised, neither the first rotation speed N1 for the assisting action nor the second rotation speed N2 for the electricity generating action is changed, thus making it possible to perform operation using the work operation actuator 37 while balancing between the assisting action and the electricity generating action.

In the above-described preferred embodiment, the first rotation speed N1 or the second rotation speed N2 is changed according to the work operation amount BD, BU, SU, or SD of the work operation actuator 37. However, the first rotation speed N1 or the second rotation speed N2 may be changed according to the operation amount of the travel operation actuator 54 (travel operation amount).

As illustrated in FIG. 8, the work controller 70 includes a speed controller 170h. The speed controller 170h includes electrical/electronic circuit(s) of the work controller 70, program(s) stored in the CPU and/or the like of the work controller 70, and/or the like. The speed controller 170h may be provided in the electricity controller 67.

Figure 13:
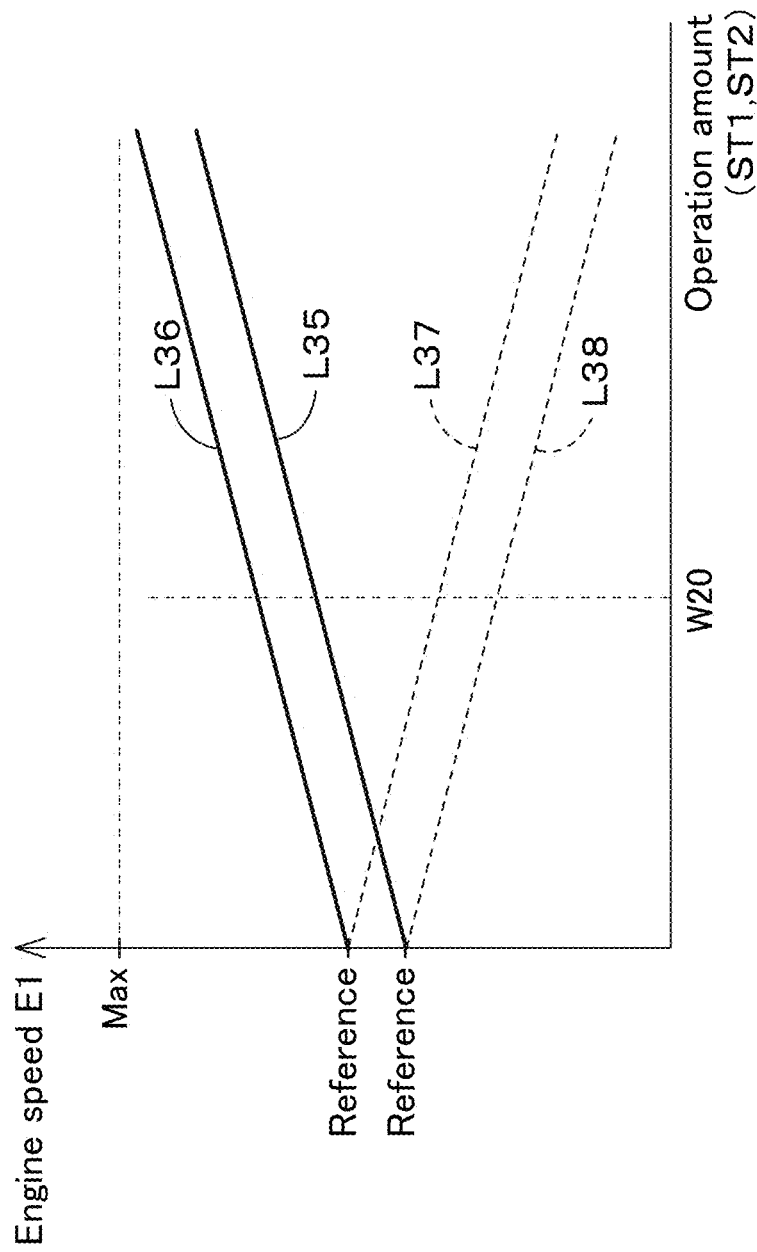
FIG. 13 shows examples of third switching lines L35 and L36.

As shown in FIG. 13, the speed controller 170h has switching information (third switching lines L35 and L36) indicating a relationship between a travel operation amount (first operation amount) ST1 and the first rotation speed N1 and indicating a relationship between the travel operation amount ST1 and the second rotation speed N2. The travel operation amount ST1 is the travel operation amount of the travel operation actuator 54 swung leftward (to the left) or rightward (to the right) to make a pivot turn. Specifically, the third switching line L35 is a line based on which the first rotation speed N1 is set according to the travel operation amount ST1 for a pivot turn, and the third switching line L36 is a line based on which the second rotation speed N2 is set according to the travel operation amount ST1 for a pivot turn.

The speed controller 170h has switching information (fourth switching lines L37 and L38) indicating a relationship between a travel operation amount (second operation amount) ST2 and the first rotation speed N1 and indicating a relationship between the travel operation amount ST2 and the second rotation speed N2. The travel operation amount ST2 is the travel operation amount of the travel operation actuator 54 swung leftward (to the left) or rightward (to the right) to make a spin turn. Specifically, the fourth switching line L37 is a line based on which the first rotation speed N1 is set according to the travel operation amount ST2 for a spin turn, and the fourth switching line L38 is a line based on which the second rotation speed N2 is set according to the travel operation amount ST2 for a spin turn.

As indicated by the third switching lines L35 and L36 in FIG. 13, when the work operation actuator 37 has not been operated and is in neutral position, the speed controller 170h sets the first rotation speed N1 and the second rotation speed N2 each to a reference engine speed E1. As indicated by the third switching lines L35 and L36, when the work operation actuator 37 is operated, the first rotation speed N1 and the second rotation speed N2 are gradually increased with the travel operation amount ST1.

Furthermore, as indicated by the fourth switching lines L37 and L38 in FIG. 13, when the work operation actuator 37 has not been operated and is in neutral position, the speed controller 170h sets the first rotation speed N1 and the second rotation speed N2 each to a reference engine speed E1. As indicated by the fourth switching lines L37 and L38, when the work operation actuator 37 is operated, the first rotation speed N1 and the second rotation speed N2 are gradually reduced with the travel operation amount ST2.

That is, when the travel operation actuator 54 is operated to make a pivot turn, the speed controller 170h increases the first rotation speed N1 and the second rotation speed N2, whereas, when the travel operation actuator 54 is operated to make a spin turn, the speed controller 170h reduces the first rotation speed N1 and the second rotation speed N2.

Figure 14:
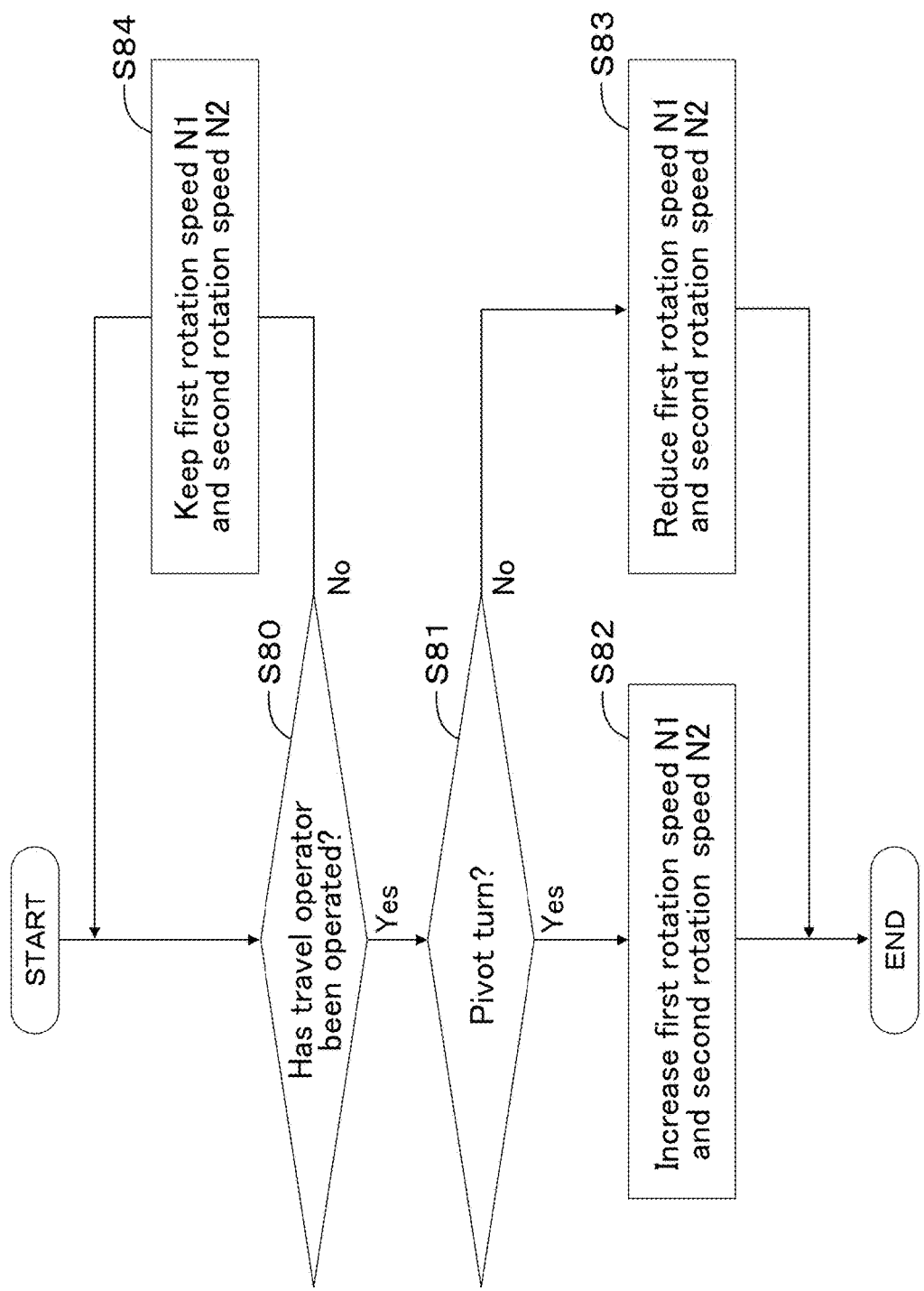
FIG. 14 shows another action of changing the first rotation speed N1 and the second rotation speed N2 when the travel operation actuator is operated.

FIG. 14 shows the action of changing the first rotation speed N1 and the second rotation speed N2 in the case where the operation actuator is operated.

As shown in FIG. 14, the speed controller 170h determines whether or not the travel operation actuator 54 has been operated (S80) and, if it is determined that the travel operation actuator 54 has been operated (Yes in S80), the speed controller 170h determines whether the travel operation actuator 54 has been operated to make a pivot turn or a spin turn (S81). For example, the speed controller 170h refers to pressure detected by the pressure sensor 171 which detects pilot pressures (first pressure, second pressure, third pressure, and fourth pressure) in respective portions of the travel fluid passage 45 (first travel fluid passage 45a, second travel fluid passage 45b, third travel fluid passage 45c, and fourth travel fluid passage 45d). The first pressure is a pilot pressure acting in the first travel fluid passage 45a, the second pressure is a pilot pressure acting in the second travel fluid passage 45b, the third pressure is a pilot pressure acting in the third travel fluid passage 45c, and the fourth pressure is a pilot pressure acting in the fourth travel fluid passage 45d. It is noted here that if the first pressure, the second pressure, the third pressure, and the fourth pressure detected by the pressure sensor 171 are each more than zero, the first pressure and the second pressure are substantially the same, and the third pressure or the fourth pressure is equal to or greater than a predetermined pressure, the speed controller 170h determines that the travel operation actuator 54 has been operated to make a pivot turn. Alternatively, if the first pressure, the second pressure, the third pressure, and the fourth pressure detected by the pressure sensor 171 are each more than zero, the third pressure and the fourth pressure are substantially the same, and the first pressure and the second pressure are equal to or greater than a predetermined pressure, the speed controller 170h determines that the travel operation actuator 54 has been operated to make a pivot turn. On the other hand, if, among the first pressure, the second pressure, the third pressure, and the fourth pressure detected by the pressure sensor 171, the first pressure or the second pressure is zero and the third pressure or the fourth pressure is zero, the speed controller 170h determines that the travel operation actuator 54 has been operated to make a spin turn. In other words, if the first pressure and the fourth pressure are equal to or greater than a predetermined pressure and the second pressure and the third pressure are substantially zero or if the second pressure and the third pressure are equal to or greater than a predetermined pressure and the first pressure and the fourth pressure are substantially zero, the speed controller 170h determines that the travel operation actuator 54 has been operated to make a spin turn.

Note that, although whether the travel operation actuator 54 has been operated to make a pivot turn or a spin turn is determined based on the first pressure to the fourth pressure detected by the pressure sensor 171 in the above-described preferred embodiment, there is no limitation on the method of determining.

If it is determined that the travel operation actuator 54 has been operated to make a pivot turn (Yes in S81), the speed controller 170h increases the first rotation speed N1 and the second rotation speed N2 by using the travel operation amount detected by the second operation detecting device 77B as the travel operation amount ST1 and applying the travel operation amount ST1 to the third switching lines L35 and L36 (S82). On the other hand, if it is determined that the travel operation actuator 54 has been operated to make a spin turn (No in S81), the speed controller 170h reduces the first rotation speed N1 and the second rotation speed N2 by using the travel operation amount detected by the second operation detecting device 77B as the travel operation amount ST2 and applying the travel operation amount ST2 to the fourth switching lines L37 and L38 (S83). Note that, if the travel operation actuator 54 has been operated to perform something other than the pivot turn and the spin turn, the speed controller 170h keeps the first rotation speed N1 and the second rotation speed N2 each at a reference value. The speed controller 170h keeps the first rotation speed N1 and the second rotation speed N2 each at a reference value also when the travel operation actuator 54 has not been operated (S84).

Note that the following operation may be used. When the remaining power of the battery 66 is less than a predetermined remaining power, the speed controller 170h keeps the first rotation speed N1 and the second rotation speed N2 each at a reference value regardless of the values of the travel operation amounts ST1 and ST2, i.e., even if the travel operation actuator 54 is operated.

Although both the first rotation speed N1 and the second rotation speed N2 are changed based on the travel operation amount ST1 or ST2 in the above-described preferred embodiment, either the first rotation speed N1 or the second rotation speed N2 may be changed.

A working machine 1 according to a preferred embodiment of the present invention includes a speed controller 170h to change a first rotation speed N1 or a second rotation speed N2 according to an operation amount of a travel operation actuator 54 (travel operation amount ST1 or ST2). This makes it possible to change the point in time at which the assisting action or the electricity generating action is started (switching position) relative to engine speed E1, according to the travel operation amount ST1 or ST2 for the working machine to travel. Accordingly, it is possible to flexibly change output depending on travel.

The machine body 2 is configured to make a first turn (pivot turn) in which one of the pair of traveling devices 4L and 4R is driven and the other is stopped and a second turn (spin turn) in which the pair of traveling devices 4L and 4R are driven in respective different directions; and the speed controller 170h changes the first rotation speed N1 or the second rotation speed N2 according to a travel operation amount (first operation amount) ST1 for the first turn (pivot turn) or a travel operation amount (second operation amount) ST2 for the second turn (spin turn). This makes it possible to change output according to the travel operation amount ST1 or ST2 when the working machine 1 makes a pivot turn or a spin turn.

The speed controller 170h increases the first rotation speed N1 or the second rotation speed N2 according to the travel operation amount (first operation amount) ST1 when the first turn (pivot turn) is made, and reduces the first rotation speed N1 or the second rotation speed N2 according to the travel operation amount (second operation amount) ST2 when the second turn (spin turn) is made. With this, the first rotation speed N1 or the second rotation speed N2 is reduced so that the electricity generating action is more likely to occur when a load is applied such as when a spin turn is made, and the first rotation speed N1 or the second rotation speed N2 is increased so that the assisting action is more likely to occur when a load is small such as when a pivot turn is made. This makes it possible to reduce unnecessary assistance as a whole.

The working machine 1 includes a pair of travel motors 36L and 36R to drive the pair of traveling devices 4L and 4R, respectively, and a pair of travel pumps 52L and 52R to drive the pair of travel motors 36L and 36R, wherein the travel operation actuator 54 is for operation of the pair of travel pumps 52L and 52R.

The travel pump 52L, which is one of the pair of travel pumps 52L and 52R, is a swash plate pump to change, according to a pilot pressure acting on a first pressure receiver and a second pressure receiver, a driving force to drive one of the pair of travel motors (travel motor 36R), and the travel pump 52R, which is the other of the pair of travel pumps 52L and 52R, is a swash plate pump to change, according to a pilot pressure acting on a third pressure receiver and a fourth pressure receiver, a driving force to drive the other of the pair of travel motors (travel motor 36R). With this, when, for example, the working machine 1 is caused to travel by the travel motors 36L and 36R and the travel pumps 52L and 52R, the first rotation speed N1 and the second rotation speed N2 are changed according to the travel operation amount ST1 or ST2, thus making it possible to cause the working machine 1 to travel more stably. In particular, it is possible to provide improved maneuverability when operating the travel operation actuator 54.

The work controller 70 may set, according to a change in engine speed E1 after operation of the operation actuator (work operation actuator 37, travel operation actuator 54), a point in time at which the assisting action is performed. The electricity controller 67 may set, according to a change in engine speed E1 after operation of the operation actuator (work operation actuator 37, travel operation actuator 54), a point in time at which the assisting action is performed.

Figure 15:
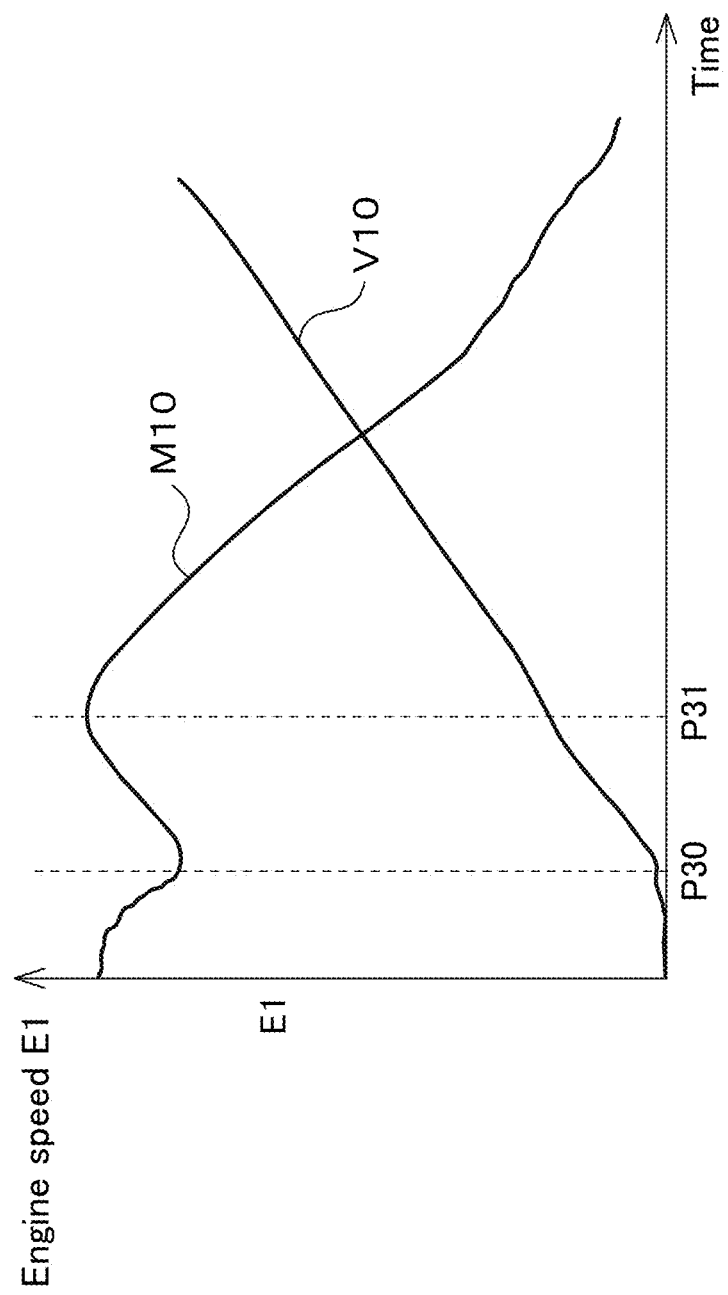
FIG. 15 shows a relationship between changes M10 in engine speed E1 and changes in turning speed V10.

FIG. 15 shows a relationship between changes M10 in the engine speed E1 and changes in turning speed V10. As shown in FIG. 15, when the travel operation actuator 54 is operated to make a pivot turn or a spin turn at a point in time P30, the travel pumps 52L and 52R are switched to a normal rotation position or a reverse rotation position via a neutral position. With this, the changes M10 in the engine speed E1 are as follows: the engine speed E1 first increases from the point in time P30 and then starts to gradually decrease from a point in time P31 after a certain period of time T25. The action controller 70d of the work controller 70 does not perform the assisting action between the point in time P30 and the point in time P31, and performs the assisting action at or after the point in time P3, i.e., after the engine speed E1 has decreased. That is, the action controller 70d of the work controller 70 starts the assisting action when the turning speed V10 at which the machine body 2 is turned by a pair of traveling devices 4L and 4R has increased and the engine speed E1 has decreased after having increased. Note that the working machine 1 includes a rotation detecting device 85 to detect the rotation speed of the traveling devices 4L and 4R (see FIG. 8). The rotation detecting device 85 is a sensor to detect rotation speeds M1 and M2 of the respective output shafts 35L and 35R of the travel motors 36L and 36R. The work controller 70 is configured or programmed to calculate the turning speed V10 based on the rotation speeds M1 and M2 detected by the rotation detecting device 85.

Figure 16:
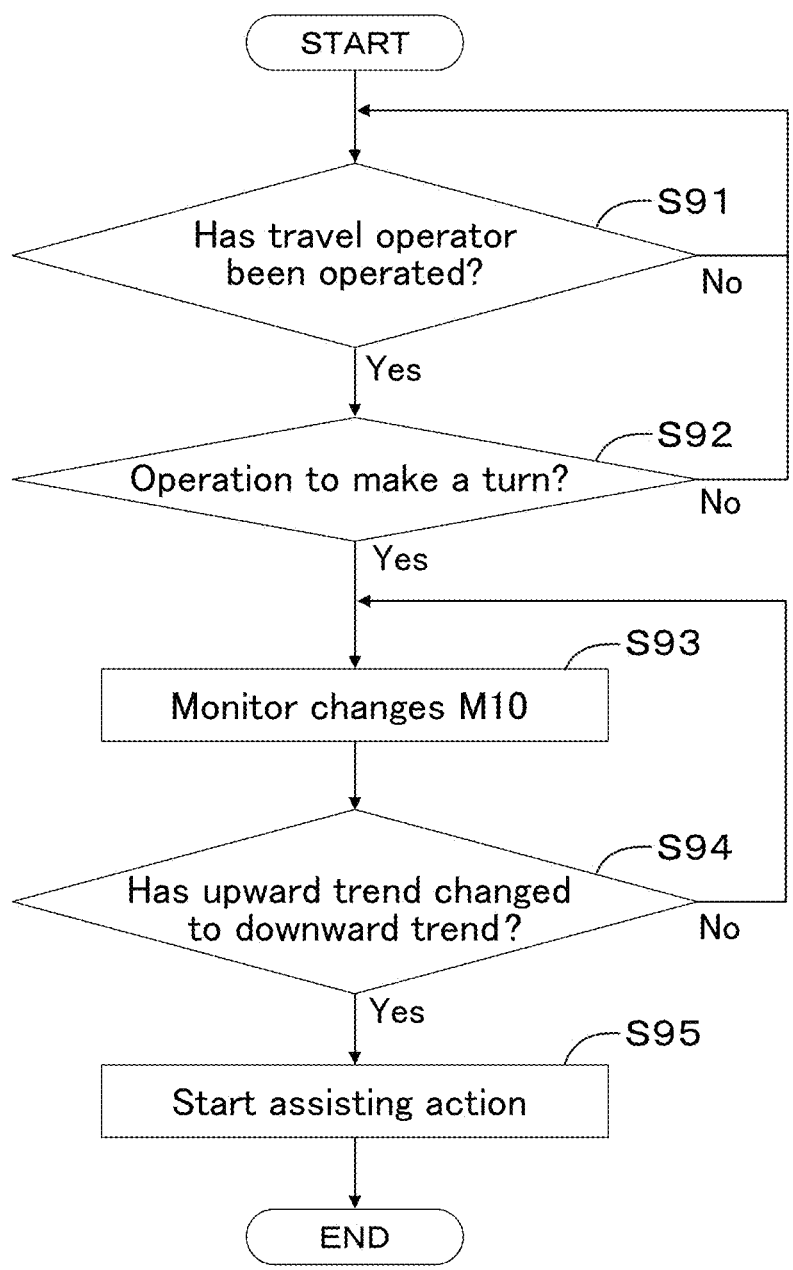
FIG. 16 shows an action of setting a point in time at which an assisting action is performed.

FIG. 16 shows a flow of how the action controller 70d of the work controller 70 sets the point in time at which the assisting action is performed. Note that the description with reference to FIG. 16 is based on the assumption that, when the assisting action is performed, the motoring torque is set by the motoring torque setting unit 70b based on the engine speed E1 as described earlier.

As shown in FIG. 16, the action controller 70d determines whether or not the travel operation actuator 54 has been operated (S91). If the travel operation actuator 54 has been operated (Yes in S91), the action controller 70d determines whether or not the operation is to make a turn (operation to make a pivot turn, operation to make a spin turn) (S92). Note that whether or not the operation is to make a turn (operation to make a pivot turn, operation to make a spin turn) is determined based on the first pressure, second pressure, third pressure, and fourth pressure detected by the pressure sensor 171, as described earlier.

If the operation is to make a turn (operation to make a pivot turn, operation to make a spin turn) (Yes in S92), the action controller 70d monitors the changes M10 in the engine speed E1 (S93). The action controller 70d determines whether or not the upward trend of the engine speed E1 has changed to a downward trend (S94). If the upward trend of the engine speed E1 has not changed to a downward trend (No in S94), the assisting action is not performed. That is, the action controller 70d does not cause the assisting action to be started. If the upward trend of the engine speed E1 has changed to a downward trend (Yes in S94), the action controller 70d causes the assisting action to be started (S95). Whether or not the upward trend of the engine speed E1 has changed to a downward trend may be determined as follows. It can be determined that the upward trend of the engine speed E1 has changed to a downward trend if a moving average of changes in the engine speed E1 during a predetermined period (for example, about 50 ms) is equal to or less than a predetermined value, or it can be determined that the upward trend of the engine speed E1 has changed to a downward trend if a decrease (rate of decrease) in the engine speed E1, obtained using a low-pass filter, is equal to or greater than a reference value.

Note that the action controller 70d may cause the assisting action to be started when the turning speed V10 is equal to or greater than a predetermined speed and the upward trend of the engine speed E1 has changed to a downward trend.

A working machine 1 according to a preferred embodiment of the present invention includes a controller (work controller 70, electricity controller 67) to set, according to a change M10 in engine speed E1 after operation of the travel operation actuator 54, a point in time at which the assisting action is performed. With this, for example, it is possible to determine whether the engine 60 needs assistance based on the change M10 in the engine 60 and possible to achieve the following results. Assistance is provided when the assistance is needed and no assistance is provided when the assistance is not needed. This makes it possible to improve the efficiency of assistance.

The controller (work controller 70, electricity controller 67) causes the assisting action to be performed after the engine speed E1 has started decreasing after having increased. This makes it possible to achieve the following results. Assistance is not provided when the engine speed E1 is in an upward trend and the engine is not working at full power, and assistance is provided when the engine speed E1 has decreased.

The working machine 1 according to a preferred embodiment of the present invention includes an operation valve 55 (55a, 55b, 55c, and/or 55d) to determine a pilot pressure according to the operation of the travel operation actuator 54, wherein an output of the hydraulic driver 64 changes with the pilot pressure determined by the operation valve 55 (55a, 55b, 55c, and/or 55d). With this, the output of the hydraulic driver 64 is done according to the operation of the operation valve 55. This makes it possible to provide more effective assistance when, for example, the engine speed E1 turns into an upward trend or a downward trend.

The working machine 1 according to a preferred embodiment of the present invention includes a pair of traveling devices 4L and 4R provided on the machine body 2, and a pair of travel motors 36L and 36R to drive the pair of traveling devices 4L and 4R, wherein the hydraulic driver 64 includes a pair of travel pumps 52L and 52R to drive the pair of travel motors 36L and 36R. This makes it possible to provide effective assistance when, for example, the traveling devices 4L and 4R are caused to function by the travel motors 36L and 36R and the travel pumps 52L and 52R.

The controller (work controller 70, electricity controller 67) causes the assisting action to be started when a speed at which the machine body 2 is turned by the pair of traveling devices (turning speed) has increased and the engine speed E1 has decreased after having increased. This makes it possible to provide more effective assistance when the working machine 1 makes a turn and the engine speed E1 varies.

The above-described preferred embodiments preferably include a configuration in which, when the work operation actuator 37 and the travel operation actuator 57 are operated, the operation valves 55 and 59 are caused to change pilot pressure. However, electrically driven operation actuators may be used. That is, the operation devices 43 and 53 may be devices to cause the hydraulic driver 64 and the control valves 51 and 48 to function using an electrical signal.

Note that, although the foregoing preferred embodiments are described using the travel operation actuator 54 as an example, the foregoing configurations may apply to cases where the work operation actuator 37 is used to operate a hydraulic pump having a neutral position.

While preferred embodiments of the present invention has been described above, it is to be understood that the preferred embodiments disclosed herein are considered as examples in all aspects and are not considered as limitations. The scope of the present invention is to be determined not by the foregoing description but by the claims, and is intended to include all variations and modifications within the scope of the claims and their equivalents.

What is claimed is:

1. A working machine comprising:
   a machine body;
   an engine on the machine body:
   a motor/generator to perform an assisting action in which the motor/generator functions as a motor to assist the engine in driving and an electricity generating action in which the motor/generator functions as a generator to generate electricity using power from the engine;
   a working device to function using power from the engine and the motor/generator;
   a work operation actuator for operation of the working device;
   an action controller to cause the assisting action to be performed when a rotation speed of the engine is equal to or less than a first rotation speed and cause the electricity generating action to be performed when the rotation speed of the engine is equal to or greater than a second rotation speed greater than the first rotation speed; and
   a speed controller to change the first rotation speed or the second rotation speed according to an operation amount of the work operation actuator.

2. The working machine according to claim 1, wherein the working device includes a boom swingably provided on the machine body, a boom cylinder to swing the boom, a working tool swingably provided on the boom, and a working tool cylinder to swing the working tool; and
the speed controller is configured or programmed to make a change to the first rotation speed or the second rotation speed according to the operation amount of the work operation actuator operated to activate the working tool cylinder.

3. The working machine according to claim 2, wherein, when the work operation actuator is operated to activate the boom cylinder and the working tool cylinder, the speed controller is configured or programmed not to make the change of the first rotation speed or the second rotation speed according to the operation amount when the work operation actuator is operated to activate the boom cylinder and the working tool cylinder.

4. The working machine according to claim 2, wherein, when the work operation actuator is operated to activate the boom cylinder to raise the boom, the speed controller is configured or programmed not to make the change of the first rotation speed or the second rotation speed according to the operation amount when the work operation actuator is operated to activate the boom cylinder and the working tool cylinder.

5. A working machine comprising:
a machine body;
an engine on the machine body;
a motor/generator to perform an assisting action in which the motor/generator functions as a motor to assist the engine in driving and an electricity generating action in which the motor/generator functions as a generator to generate electricity using power from the engine;
a hydraulic driver to receive power from the engine and the motor/generator;
an operation actuator for operation of the hydraulic driver; and
a controller to set, according to a change in rotation speed of the engine after operation of the operation actuator, a point in time at which the assisting action is performed.

6. The working machine according to claim 5, wherein the controller is configured or programmed to cause the assisting action to be performed after the rotation speed of the engine has started decreasing after having increased.

7. The working machine according to claim 5, further comprising:
an operation valve to determine a pilot pressure according to the operation of the operation actuator; wherein
an output of the hydraulic driver changes with the pilot pressure determined by the operation valve.

8. The working machine according to claim 7, further comprising:
a pair of traveling devices on the machine body; and
a pair of travel motors to drive the pair of traveling devices; wherein
the hydraulic driver includes a pair of travel pumps to drive the pair of travel motors.

9. The working machine according to claim 5, wherein the controller is configured or programmed to cause the assisting action to be started when a speed at which the machine body is turned by the pair of traveling devices has increased and the rotation speed of the engine has decreased after having increased.

10. A working machine comprising:
a machine body;
an engine on the machine body;
a motor/generator to perform an assisting action in which the motor/generator functions as a motor to assist the engine in driving and an electricity generating action in which the motor/generator functions as a generator to generate electricity using power from the engine;
a pair of traveling devices on the machine body;
a travel operation actuator for operation of the pair of traveling devices;
an action controller to cause the assisting action to be performed when a rotation speed of the engine is equal to or less than a first rotation speed and cause the electricity generating action to be performed when the rotation speed of the engine is equal to or greater than a second rotation speed greater than the first rotation speed; and
a speed controller to change the first rotation speed or the second rotation speed according to an operation amount of the travel operation actuator.

11. The working machine according to claim 10, wherein the machine body is configured to make a first turn in which one of the pair of traveling devices is driven and the other is stopped and a second turn in which the pair of traveling devices are driven in respective different directions; and
the speed controller is configured or programmed to change the first rotation speed or the second rotation speed according to a first operation amount or a second operation amount, the first operation amount being the operation amount of the travel operation actuator operated to make the first turn, the second operation amount being the operation amount of the travel operation actuator operated to make the second turn.

12. The working machine according to claim 11, wherein the speed controller is configured or programmed to increase the first rotation speed or the second rotation speed according to the first operation amount when the first turn is made, and reduce the first rotation speed or the second rotation speed according to the second operation amount when the second turn is made.

13. The working machine according to claim 10, further comprising:
a pair of travel motors to drive the pair of traveling devices, respectively; and
a pair of travel pumps to drive the pair of travel motors; wherein
the travel operation actuator is for operation of the pair of travel pumps.

14. The working machine according to claim 13, wherein:
one of the pair of travel pumps is a swash plate pump to change, according to a pilot pressure acting on a first pressure receiver and a second pressure receiver, a driving force to drive one of the pair of travel motors; and
the other of the pair of travel pumps is a swash plate pump to change, according to a pilot pressure acting on a third pressure receiver and a fourth pressure receiver, a driving force to drive the other of the pair of travel motors.

* * * * *